United States Patent [19]
Mori et al.

[11] Patent Number: 5,896,085
[45] Date of Patent: *Apr. 20, 1999

[54] APPARATUS FOR CONTROLLING LIGHT DISTRIBUTIONS OF HEAD LAMPS

[75] Inventors: Takakazu Mori; Takashi Nakamura, both of Aichi-ken, Japan

[73] Assignee: Toyota Jidosha Kabushiki Kaisha, Toyota, Japan

[*] Notice: This patent is subject to a terminal disclaimer.

[21] Appl. No.: 08/708,270

[22] Filed: Sep. 6, 1996

[30] Foreign Application Priority Data

Sep. 7, 1995 [JP] Japan ................................. 7-230412
Jun. 19, 1996 [JP] Japan ................................. 8-158426

[51] Int. Cl.$^6$ ............................................. B60Q 1/26
[52] U.S. Cl. ........................... 340/469; 340/465; 362/464; 362/465
[58] Field of Search .......................... 340/469, 468, 340/465; 362/61, 66, 274, 36, 37, 464, 465

[56] References Cited

U.S. PATENT DOCUMENTS

| | | |
|---|---|---|
| 4,620,267 | 10/1986 | Cibie . |
| 4,768,135 | 8/1988 | Kretschmer et al. . |
| 4,858,080 | 8/1989 | Oikawa .................. 362/61 |
| 4,891,559 | 1/1990 | Matsumoto . |
| 5,430,450 | 7/1995 | Holmes .................. 342/69 |
| 5,499,168 | 3/1996 | Cochard et al. . |
| 5,562,336 | 10/1996 | Gotou .................... 362/37 |
| 5,645,338 | 7/1997 | Kobayashi ............. 362/61 |
| 5,660,454 | 8/1997 | Mori et al. ............. 362/61 |
| 5,707,129 | 1/1998 | Kobayashi . |

FOREIGN PATENT DOCUMENTS

| | | |
|---|---|---|
| 0186571A1 | 7/1986 | European Pat. Off. . |
| 0340735A2 | 11/1989 | European Pat. Off. . |
| 533 508 | 3/1993 | European Pat. Off. . |
| 06426950A1 | 3/1995 | European Pat. Off. . |
| 0230620A2 | 8/1997 | European Pat. Off. . |
| 4436684A1 | 5/1995 | Germany . |
| 4341409A1 | 6/1995 | Germany . |
| 19602005A1 | 8/1996 | Germany . |
| 19602622A1 | 8/1996 | Germany . |
| 5-196632 | 8/1993 | Japan . |
| 6-40287 | 2/1994 | Japan . |
| 6-72234 | 3/1994 | Japan . |
| 6-191315 | 7/1994 | Japan . |
| 6-191344 | 7/1994 | Japan . |
| 6-267304 | 9/1994 | Japan . |

OTHER PUBLICATIONS

Ito, "Development of D–GPS System" (available partial translation attached).

System Perspective, Automotive Engineering Dec. 1995 Electrical System Advances, Marcus Jacobson, Pp. 70–71.

*Primary Examiner*—Jeffery A. Hofsass
*Assistant Examiner*—Julie Lieu
*Attorney, Agent, or Firm*—Pillsbury Madison & Sutro LLP

[57] ABSTRACT

An apparatus for controlling light distribution of a vehicle head lamp has a first calculating means for estimating a driver's view position, a second calculating means for estimating a deviation angle formed by a running direction of the vehicle and a direction of the driver's view position, control means for controlling the light distribution composed of beam orientation, beam spread and upper bright-dark limit, said control means further comprising control-lamp selecting means which selects a high-beam head lamp or a low-beam head lamp corresponding to the result of the first calculating means.

The first calculating means estimates a driver's view position which is determined by the distance reached by the vehicle after an estimated time along a forward roadway, which accounts for the driver's abilities.

The second calculating means provides the deviation angle formed between the running direction of the vehicle and the direction of the driver's line of view.

21 Claims, 28 Drawing Sheets

F I G. 1
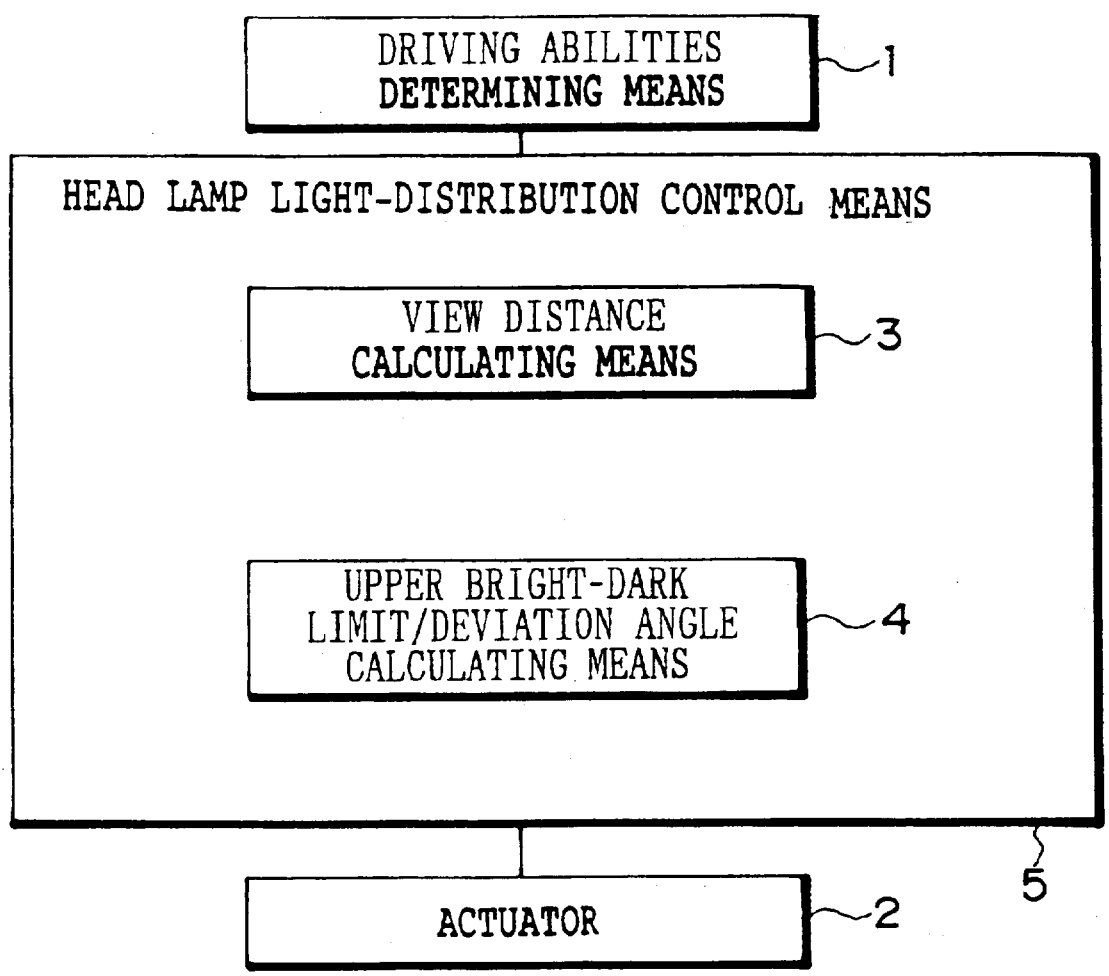

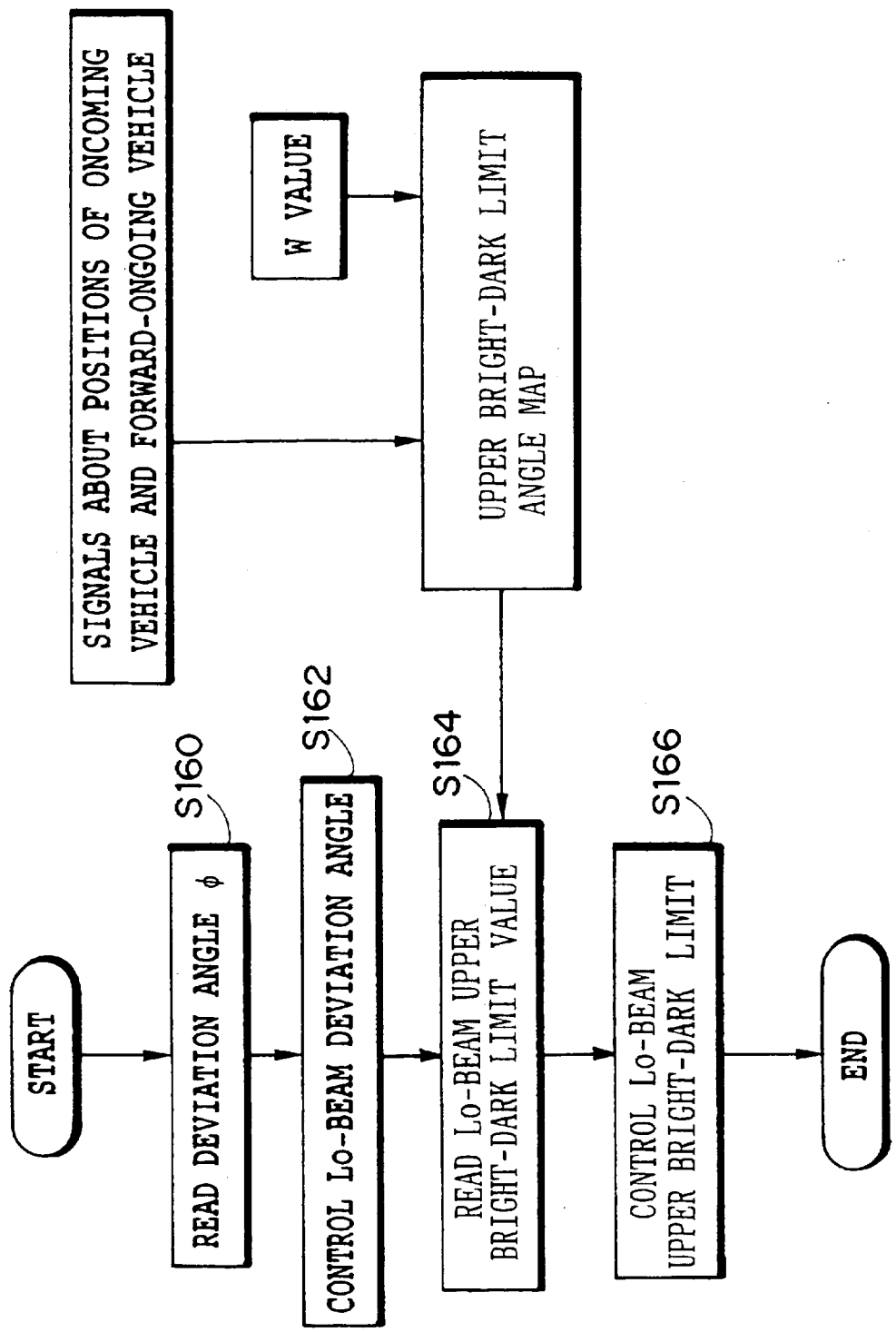

APPARATUS FOR CONTROLLING LIGHT DISTRIBUTIONS OF HEAD LAMPS

BACKGROUND OF THE INVENTION

1. Field of the Invention

The present invention relates to an apparatus for controlling light distributions of head lamps, and particularly to an apparatus for controlling light distributions of head lamps which illuminate the front of a vehicle while the vehicle is running.

2. Description of the Related Art

It is known to provide vehicles with head lamps to improve visibility in front of a driver during night or the like. In general, head lamps are attached to both sides of the front end of a vehicle and they illuminate a relatively wide range. Since, however, the head lamps are fixed, there may be cases where the driver continuously visually observes a dark portion out of the illumination range of the head lamps when the vehicle is being driven, e.g., when the vehicle is being turned, so that portions necessary for the driver to watch during driving cannot be brightly illuminated.

To improve driver visibility, an apparatus for controlling light distributions of head lamps has been disclosed in Japanese Patent Application Laid-Open No. 6(1994)-72234 (corresponding to the priority document for U.S. Pat. No. 5,660,454) as an illustrative example. This apparatus includes a vehicle speed sensor, head lamps in which the light distribution composed of beam spread and beam orientation is changeable, a calculating means and a control means. The calculating means calculates a driver's view position which is determined by the distance the vehicle reaches after a predetermined time along a forward roadway, and calculates a deviation angle formed by a running direction of the vehicle and a direction of said driver's view position. The control means controls the light distribution composed of beam spread and beam orientation of said head lamp on the basis of a result of calculations by said calculating means. Accordingly, the head lamps apply the light to the position which will be observed by the driver so that the visibility at the time of driving is ensured.

SUMMARY OF THE INVENTION

The present invention provides an improved driver visibility in automobiles for controlling light distribution of a head lamp, selecting a high-beam head lamp or a low-beam head lamp corresponding to the driver's operating features, and especially provides an improved driver visibility turning on a high-beam head lamp.

Specifically, a control means for controlling the light distribution composed of beam orientation, beam spread and upper bright-dark limit, further comprising control-lamp selecting means turns on a high beam head lamp, corresponding to the result of a first calculating means which estimates a driver's view position, and said first calculating means moreover estimates a driver's view position with respect to the driver's abilities as determined by level of the driving skillfulness.

Specifically, a second calculating means estimates a deviation angle formed by the running direction of the vehicle and the direction of the driver's view position, and moreover modified within the driver's field of vision corresponding to the configuration of the forward roadway.

Therefore, this invention achieves the light distribution for good visibility for any drivers and any driving conditions.

Accordingly, it is one object of the present invention to provide an apparatus for controlling light distribution of a head lamp being selected, whether a high-beam head lamp, or a low-beam head lamp corresponding to the result of a first calculating means which estimates a driver's view position.

It is another object of the present invention to provide an apparatus for controlling light distribution of a head lamp corresponding to the result of the driver's abilities as determined by level of the driving skillfulness.

It is another object of the present invention to provide an apparatus for controlling the light distribution of a head lamp corresponding to the driver's operating features.

It is another object of the present invention to provide an apparatus for controlling the light distribution of a head lamp, improving driver visibility for controlling light distribution of the head lamp, and selecting a high-beam head lamp or a low-beam head lamp corresponding to the driver's operating features.

It is another object of the present invention to provide an apparatus for controlling light distribution of a head lamp, thus improving driver visibility, especially upon turning on a high-beam head lamp.

It is another object of the present invention to provide an apparatus for controlling light distribution of a head lamp, by estimating the actual driver's field of vision based on the configuration of the forward roadway, which is effective especially on complicated roadways.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 1 is a view conceptually showing the structure of a first embodiment of the present invention;

FIG. 17B is a flowchart for describing a subroutine executed by the embodiment shown in FIG. 17A;

DETAILED DESCRIPTION OF THE PREFERRED EMBODIMENTS

One embodiment of the present invention will hereinafter be described in detail with reference to the accompanying drawings. The following embodiment shows one in which the present invention is applied to an apparatus for controlling light distributions of head lamps provided in front of a vehicle.

(Structure of Vehicle 10)

Figure 2:
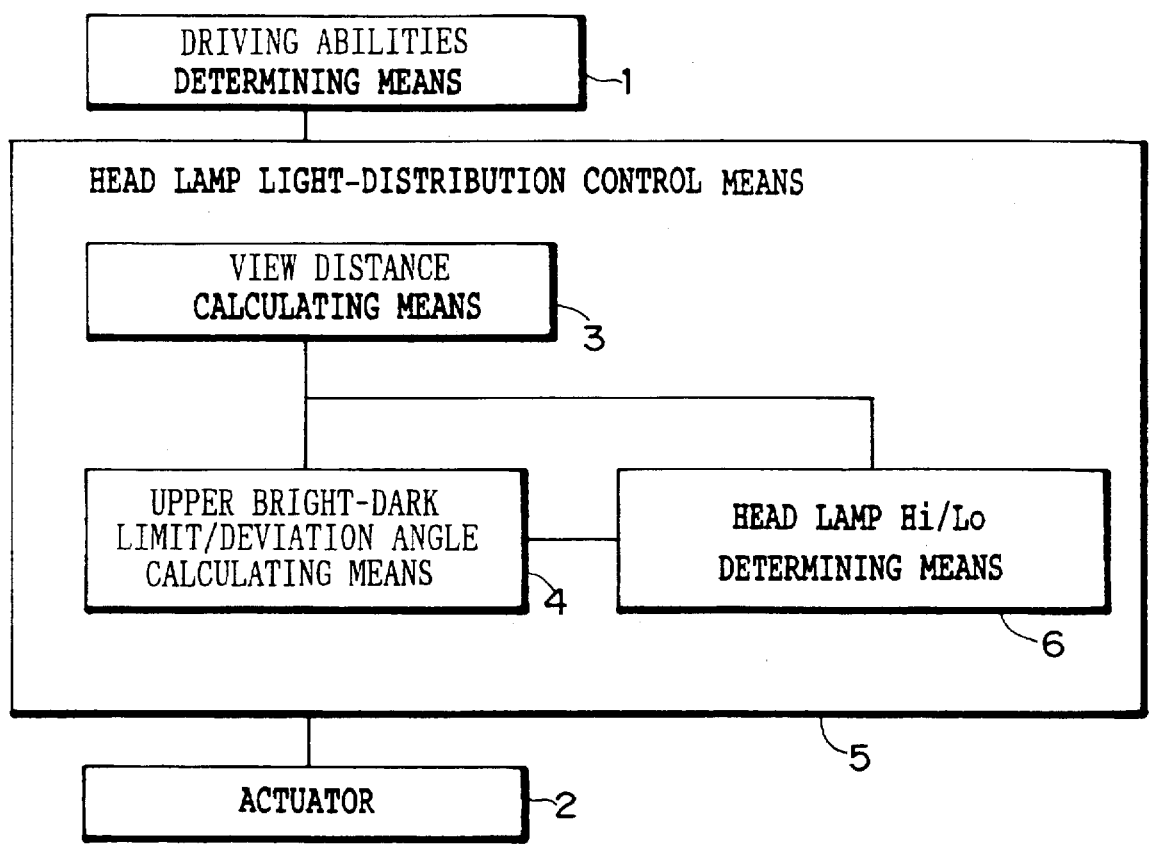
FIG. 2 is a view conceptually illustrating the structure of a second embodiment of the present invention.
Figure 3:
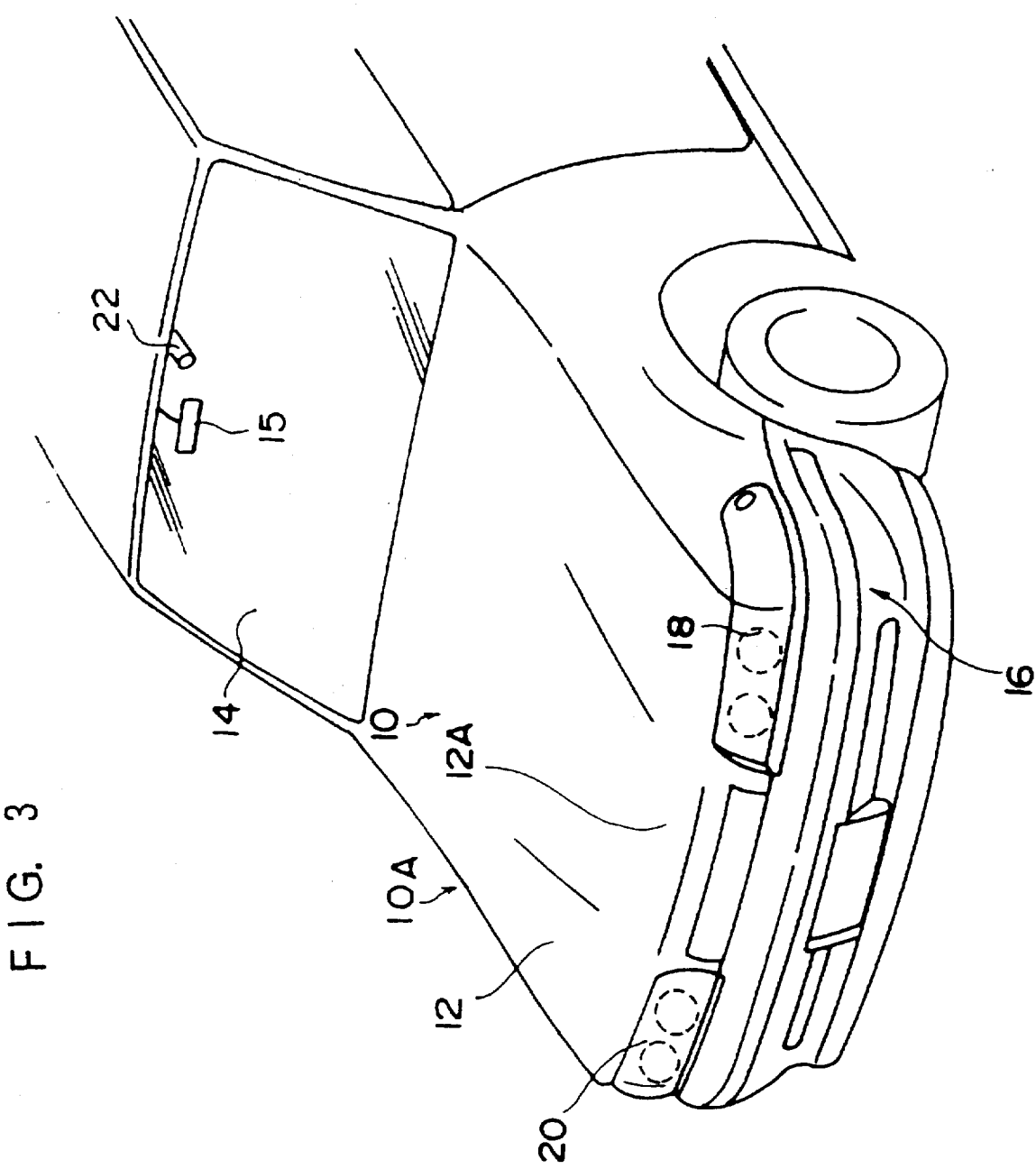
FIG. 3 is a perspective view showing a vehicle front portion of the present embodiment as seen from a diagonal front portion of the vehicle.

As shown in FIG. 3, an engine hood 12 is provided on the upper surface of a front body 10A of a vehicle 10. The engine hood 12 is swingably attached to a body frame by hinges (not shown) provided at a rear end portion thereof. A front bumper 16 is fixed to transversely-extending ends of a front end portion of the front body 10A. Head lamps 18 and 20 respectively provided as pairs on the left and right sides (i.e., at the transversely-extending ends) are disposed at an upper portion of the front bumper 16 and a lower portion of the front body 10A. High-beam head lamps and low-beam head lamps are respectively provided within the head lamps 18 and 20.

Further, a windshield glass 14 is provided in the neighborhood of the rear end portion of the engine hood 12. A rear view mirror 15 is provided above the windshield 14 and inside the vehicle 10. An optic or image sensor 22 including a night detection optical system for photographing the front of the vehicle is disposed in the vicinity of the rear view mirror 15.

Figure 4:
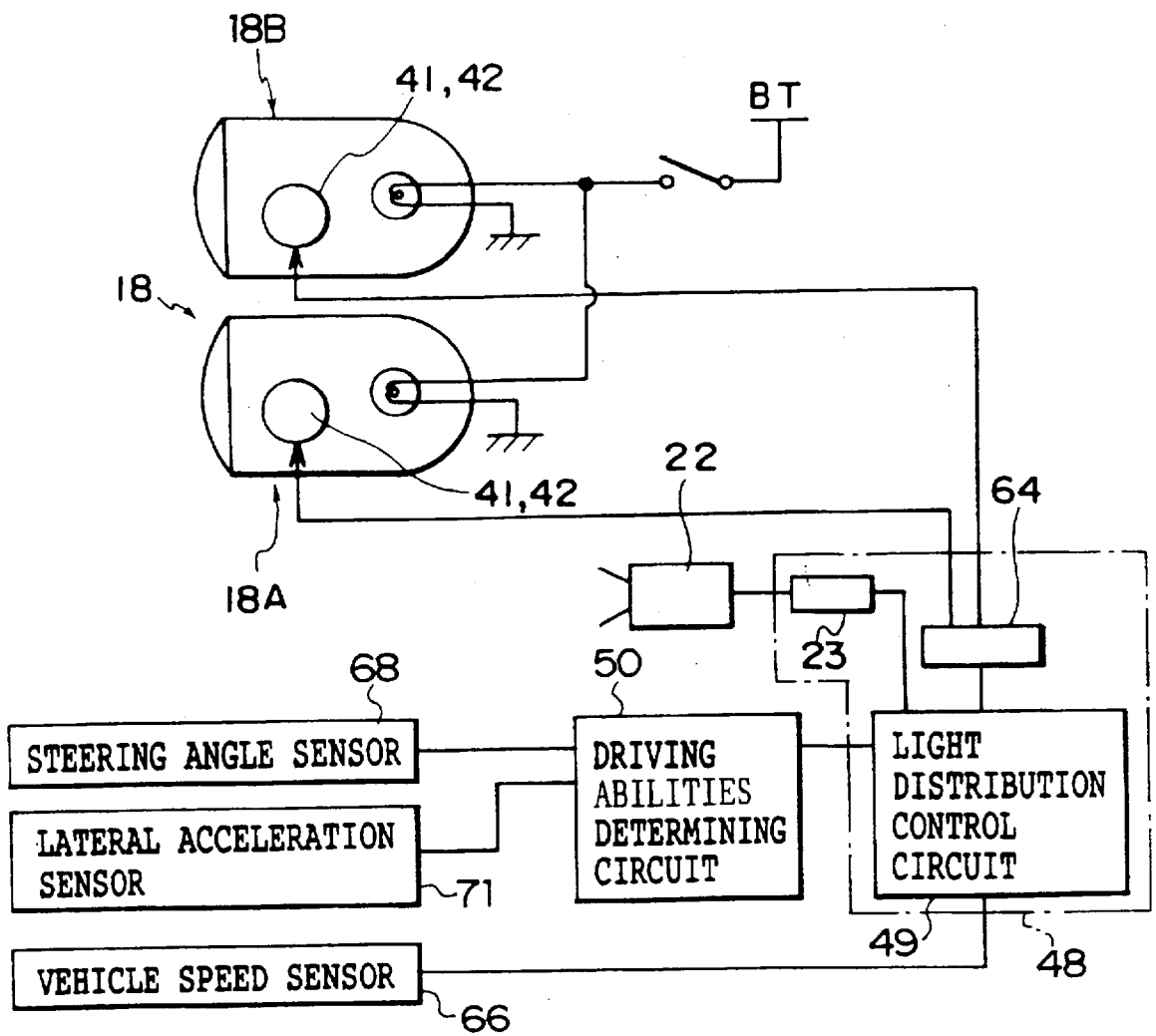
FIG. 4 is a block diagram schematically depicting the structure of a control apparatus.

As shown in FIG. 4, the optic or image sensor 22 is electrically connected to a light distribution control circuit 49 used as a view position calculating means and a head lamp high/low determining means through an image processing device 23 used as an upper bright-dark limit/ deviation angle calculating means. The image processing device 23 and the light distribution control circuit 49 are provided within a control apparatus 48 used as a head lamp light-distribution control means. It is preferable that the optic or image sensor 22 is located in the neighborhood of a driver's visual position (so-called "eyepoint") so that a driver can accurately recognize road shapes ahead of the vehicle and the position of provision of the optic or image sensor 22 makes a better match to the visual sense of the driver.

Figure 5:
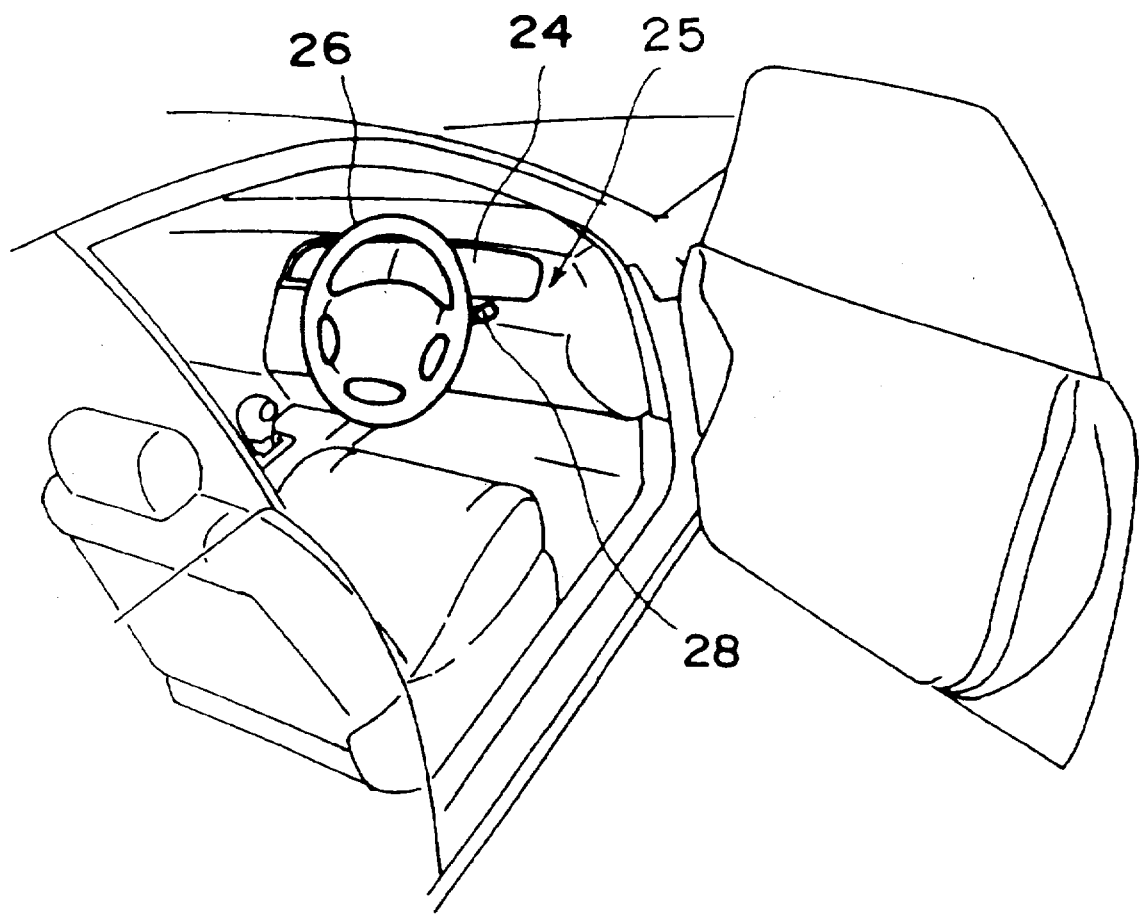
FIG. 5 is a perspective view showing a vehicle front portion as seen from a diagonal rear portion of a vehicle driver's seat.

As shown in FIG. 5, a steering wheel 26 is provided within the vehicle 10. A steering angle sensor 68 (see FIG. 4) for detecting the angle of rotation of the steering wheel 26 is attached to a rotatable shaft (not shown) of the steering wheel 26. A turn signal lever 28 is provided in the neighborhood of the rotatable shaft of the steering wheel 26.

Further, a speedometer 24 is provided within an instrument panel 25. A vehicle speed sensor 66 (see FIG. 4) for detecting a traveling speed of the vehicle 10 is attached to a cable (not shown) of the speedometer 24.

(Head Lamp)

Figure 6:
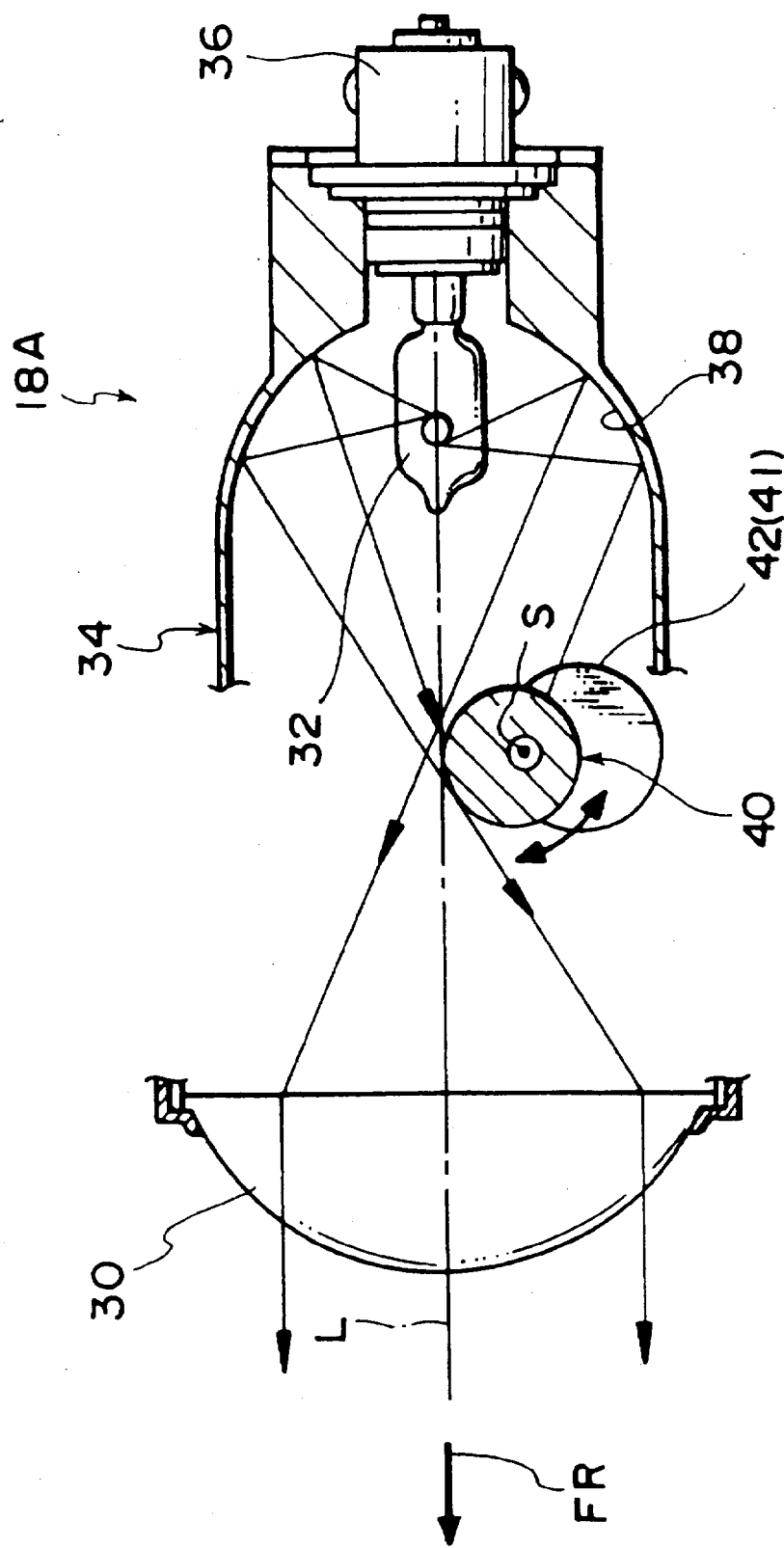
FIG. 6 is a schematic view illustrating a head lamp to which an apparatus for controlling a light distribution of the head lamp, according to the present invention is applicable.

As shown in FIG. 6, a low-beam head lamp 18A of the head lamp 18 is of a projector type head lamp and has a convex lens 30, a bulb 32 and a lamp house 34. The convex lens 30 is fixed within one opening or aperture defined in the lamp house 34 and the bulb 32 is fixed within the other aperture through a socket 36 so that a light-emitting point is located on the optical axis L (corresponding to the central axis of the convex lens 30) of the convex lens 30.

A rotatable shade 40 to be described later is provided inside the lamp house 34 and between the convex lens 30 and the bulb 32. The rotatable shade 40 can be rotated by motors 41 and 42 used as actuators rotated about an axis S orthogonal to the optical axis L of the convex lens 30 in response to control signals outputted from the control apparatus 48 (see FIG. 4). A portion (corresponding to the right side as seen in FIG. 6) on the bulb 32 side of the lamp house 34 serves as a reflector 38 having an elliptic reflecting surface. The reflector 38 can be displaced from side to side (i.e., in the direction indicated by arrow M in FIG. 7) by a motor (not shown) used as an actuator rotated in response to the control signal outputted from the control apparatus 48 (see FIG. 4). Further, light emitted from the bulb 32, after having been reflected by the reflector 38, is focused on the neighborhood of the shade 40. Thus, the convex lens 30 transmits light to the front (i.e., in the direction indicated by arrow FR in FIG. 6) of the vehicle 10 with the position of the neighborhood of the shade 40 where the light of the bulb 32 is reflected and focused by the reflector 38, serving as the light-emitting point. Since a high-beam head lamp 18B of the head lamps 18 and a high-beam head lamp and a low-beam head lamp of the head lamps 20 are respectively similar in structure to the low-beam head lamp 18A, their description will be omitted.

(Shade 40 of Head Lamp 18)

Figure 7:
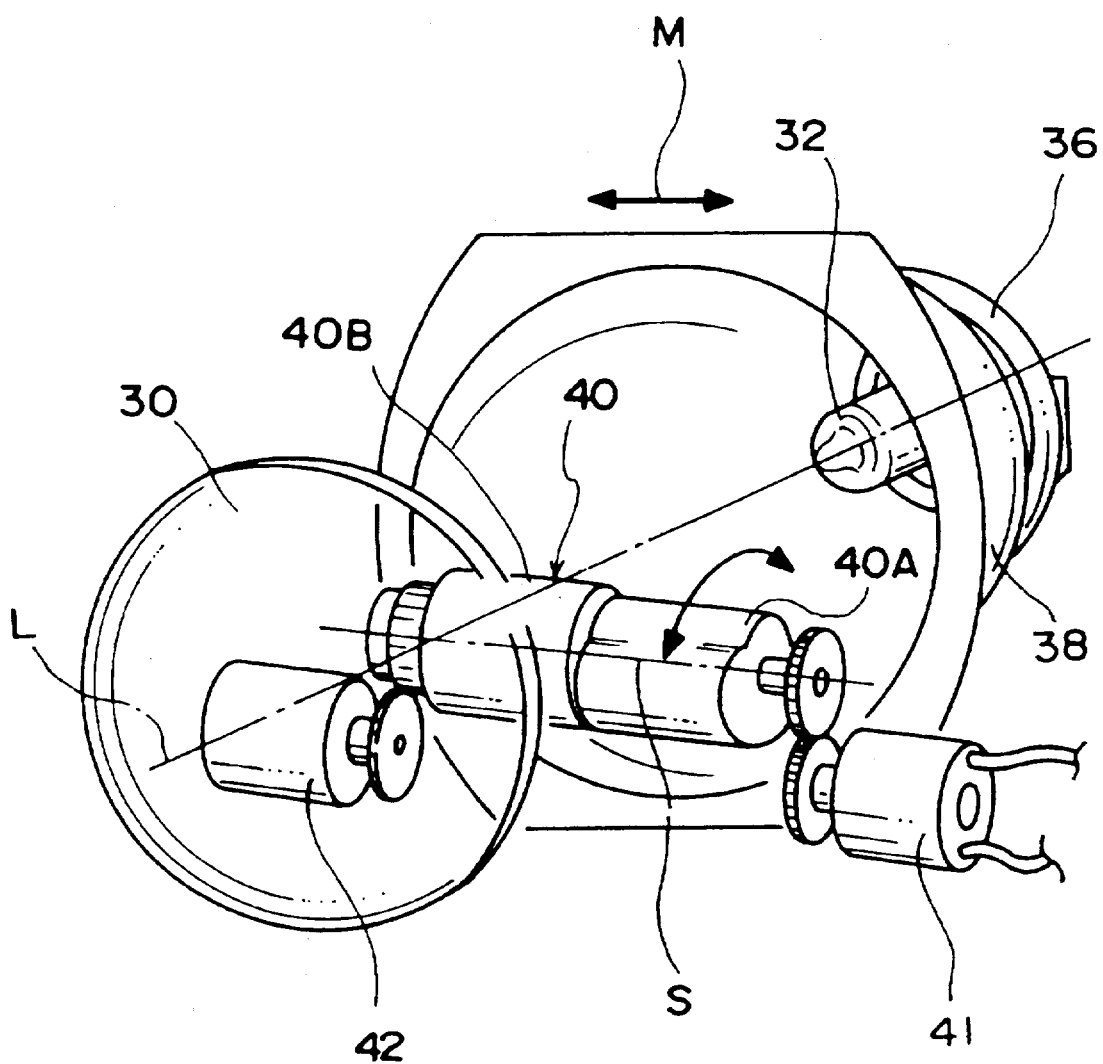
FIG. 7 is a schematic perspective view of the head lamp shown in FIG. 6.

As shown in FIG. 7, the shade 40 of the low-beam head lamp 18A has a first light-proof portion 40A and a second light-proof portion 40B. The first and second light-proof portions 40A and 40B are respectively separately rotated about the axis S which is orthogonal to the optical axis L of the convex lens 30 by rotatably driving the motors 41 and 42 in response to the control signals outputted from the control apparatus 48 (see FIG. 4). Each of the first and second light-proof portions 40A and 40B has a cross sectional configuration shaped in the form of a cam. The first light-proof portion 40A of the shade 40 is different in height from the second light-proof portion 40B thereof because different driver's visible ranges on right and left sides of the front of the vehicle 10 are different. On the left front side of the vehicle 10, for example, the driver must visually recognize pedestrians, road signs, etc. On the right front side of the vehicle 10 on the other hand, it is preferable to determine an illumination range to effect glare-proofing against an oncoming vehicle while taking into consideration securing the visibility by the driver of the pedestrians, road signs, etc.

Since a shade for the low-beam head lamp of the head lamps 20 is similar in structure to the shade 40, its description will be omitted. Further, no shade 40 is attached to the high-beam head lamp of the head lamps 20.

(Structure of Control Apparatus)

The light distribution control circuit 49 of the control apparatus 48 shown in FIG. 4 includes a read-only memory (ROM), a random access memory (RAM), a central processing unit (CPU), etc. and performs the calculation of a view position and decides whether a head lamp is either high or low. The vehicle speed sensor 66 and a driving abilities determining circuit 50 are electrically connected to the light distribution control circuit 49. The steering angle sensor 68 and a transverse or lateral acceleration sensor 71 are electrically connected to the driving abilities determining circuit 50. Further, the light distribution control circuit 49 is also electrically connected to the image processing device 23.

The vehicle speed sensor 66 outputs a signal responsive to a vehicle speed V of the vehicle 10. The transverse acceleration sensor 71 outputs a signal responsive to a lateral acceleration which acts on the vehicle 10. The steering angle sensor 68 outputs a pulse signal responsive to the angle and direction of rotation of the steering wheel 26. Further, the light distribution control circuit 49 is connected so as to activate the motors 41 and 42 via a motor drive circuit 64.

The image processing device 23 serves as a device for effecting an image process on an image photographed by the optic or image sensor 22, based on signals input from the optic or image sensor 22 and the light distribution control circuit 49 to thereby create a plane figure and determining a deviation angle φ formed by the direction of running of the vehicle 10 in real time and the direction of a line of sight that the driver visually observes according to the configuration of the forward roadway. The image processing device 23 starts image processing in response to an image process instruction signal input thereto from the light distribution control circuit 49 and outputs the determined deviation angle φ to the light distribution control circuit 49 when the image processing is finished.

Incidentally, the shape of the road includes the shape of a road on which the vehicle travels, e.g., the shape of a road corresponding to one lane formed by a center line, curbs, etc.

(Optic or Image Sensor 22)

A schematic configuration of the optic or image sensor 22 for detecting an image at a portion to which light is not applied by the head lamps 18 and 20 while the vehicle is running at nighttime, will now be described in brief.

Figure 8:
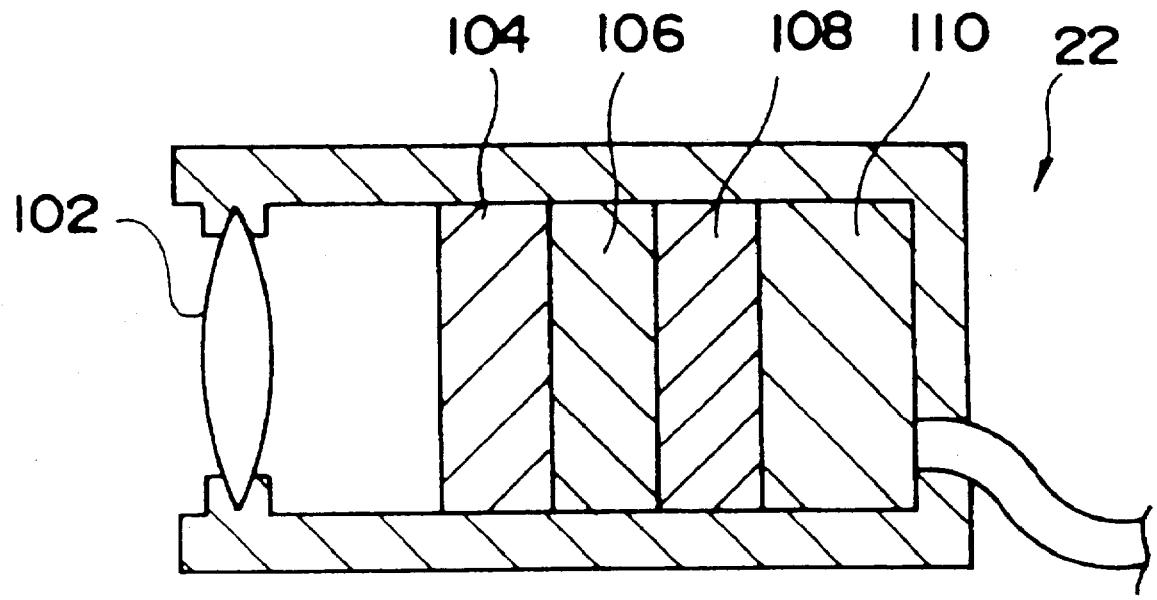
FIG. 8 is a schematic sectional view illustrating the structure of an optic or image sensor.

As shown in FIG. 8, the optic or image sensor 22 has a lens 102, a photocathode 104, a microchannel plate 106, a screen 108 and a two-dimensional CCD sensor 110. Photons incident on the lens 102 are guided to the photocathode 104 where they are converted into electrons. The electrons are amplified by the microchannel plate 106 and guided to the screen 108 so as to form an image. The image on the screen 108 is converted into an image signal by the two-dimensional CCD sensor 110 from which the converted image signal is outputted. Thus, the image signal at the dark portion to which no light is applied by the head lamps 18 and 20, can be outputted using the optic or image sensor 22.

Incidentally, the present embodiment shows, as an example, the case where the optic or image sensor 22 is used to detect the image at the dark portion during the night running as described above. However, an image intensifier tube for converting X rays or corpuscular rays into a visible image and multiplying the intensity of the dark visible image to convert the dark visible image to a bright visible image may be used in a two-dimensional image sensor of a two-dimensional CCD camera or the like to form an optic or image sensor so as to detect an image at a dark portion.

(Upper Bright-Dark Limit and Light Distribution Patterns)

In the present embodiment, upper bright-dark limits of the head lamps 18 and 20 are controlled by rotating the first light-proof portion 40A and the second light-proof portion 40B of the shade 40.

Figure 9:
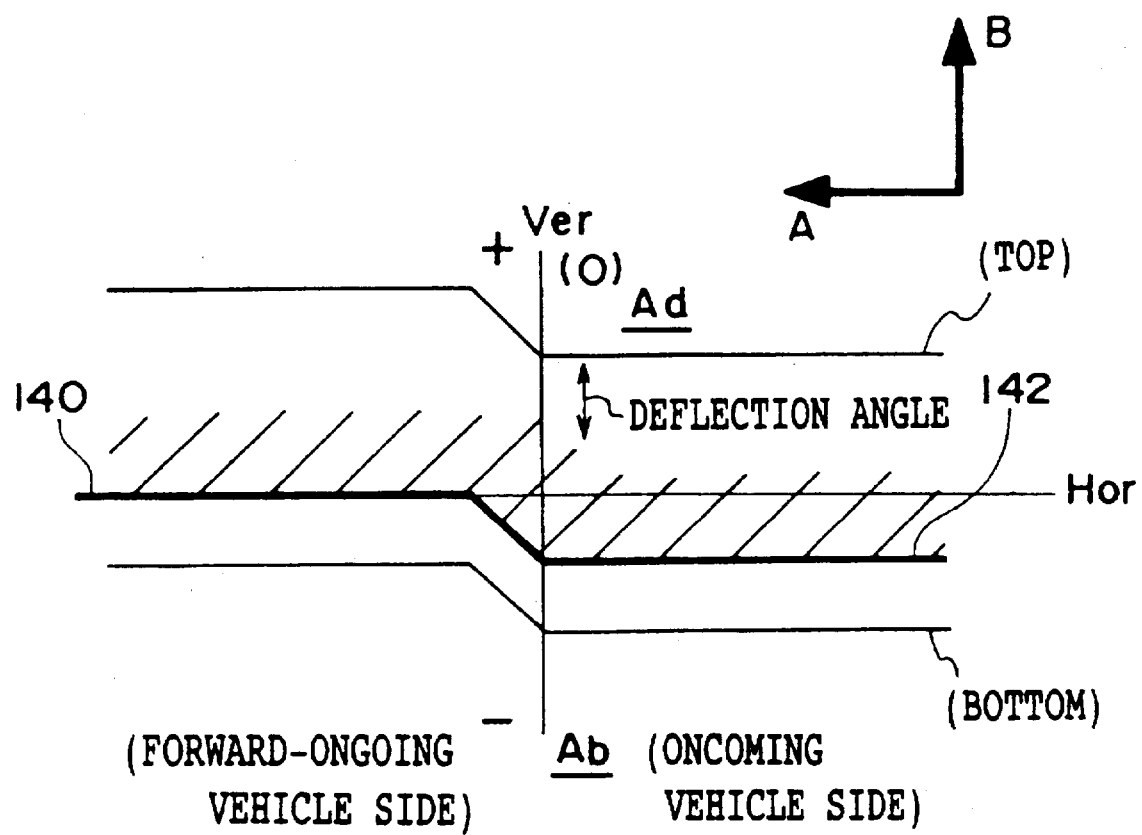
FIG. 9 is an image view showing upper bright-dark limit at the time of the turning on of a head lamp.
Figure 10:
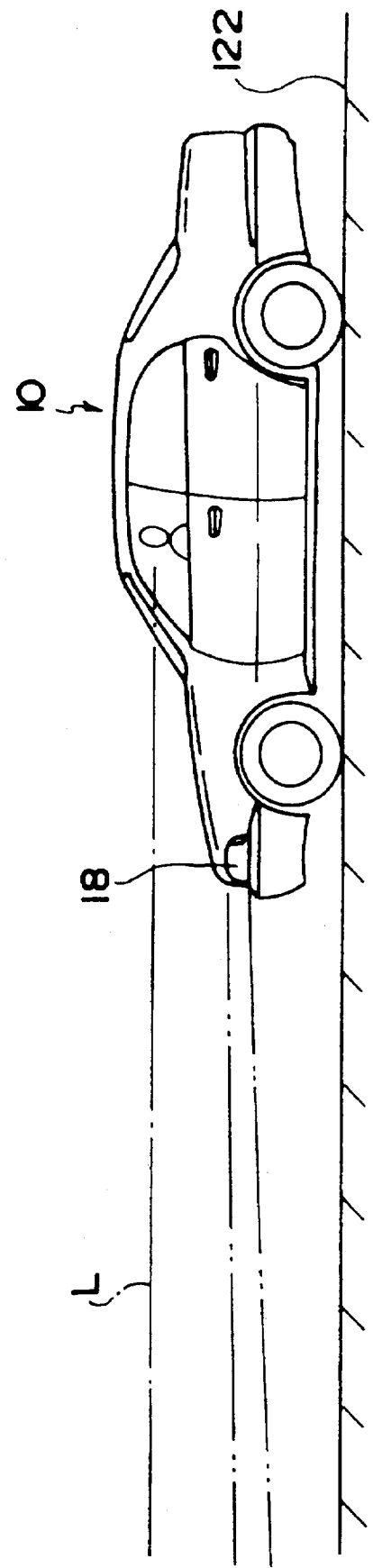
FIG. 10 is a side view of a vehicle at the time of the turning on of head lamps.

FIG. 9 is an image view of upper bright-dark limits obtained when the road is illuminated by the head lamps 18 and 20 while the vehicle is running during the night (see FIG. 10).

The application of light to the road by the head lamp 18 is restricted by the shade 40 (see FIG. 7). Namely, the boundary between the application of the light to the road by the head lamp 18 and the non-application of the light thereto is indicated by an upper bright-dark limit 140 and a cut line 142 controlled under the rotation of the first and second light-proof portions 40A and 40B. A region Ad extending in an upward direction (i.e., in the direction indicated by arrow B in FIG. 9), which is produced by making these upper bright-dark limits continuous, is prevented from being subjected to light.

The displacement of the upper bright-dark limit 140 in the upward and downward directions (i.e., in the direction indicated by arrow B in FIG. 9 and in the direction opposite to the arrow B direction) is associated with an achievable distance of light at an end of a bright region Ab in which each head lamp 18 applies the light toward the front from the vehicle 10.

Thus, the region where the light is applied to the surface of the road, can be freely set by rotating the first and second light-proof portions 40A and 40B of the shade 40.

A description will now be made of a light distribution pattern Z obtained when the head lamps 18 and 20 are displaced according to the shape (linearity and zigzagness) of the road.

Figure 11:
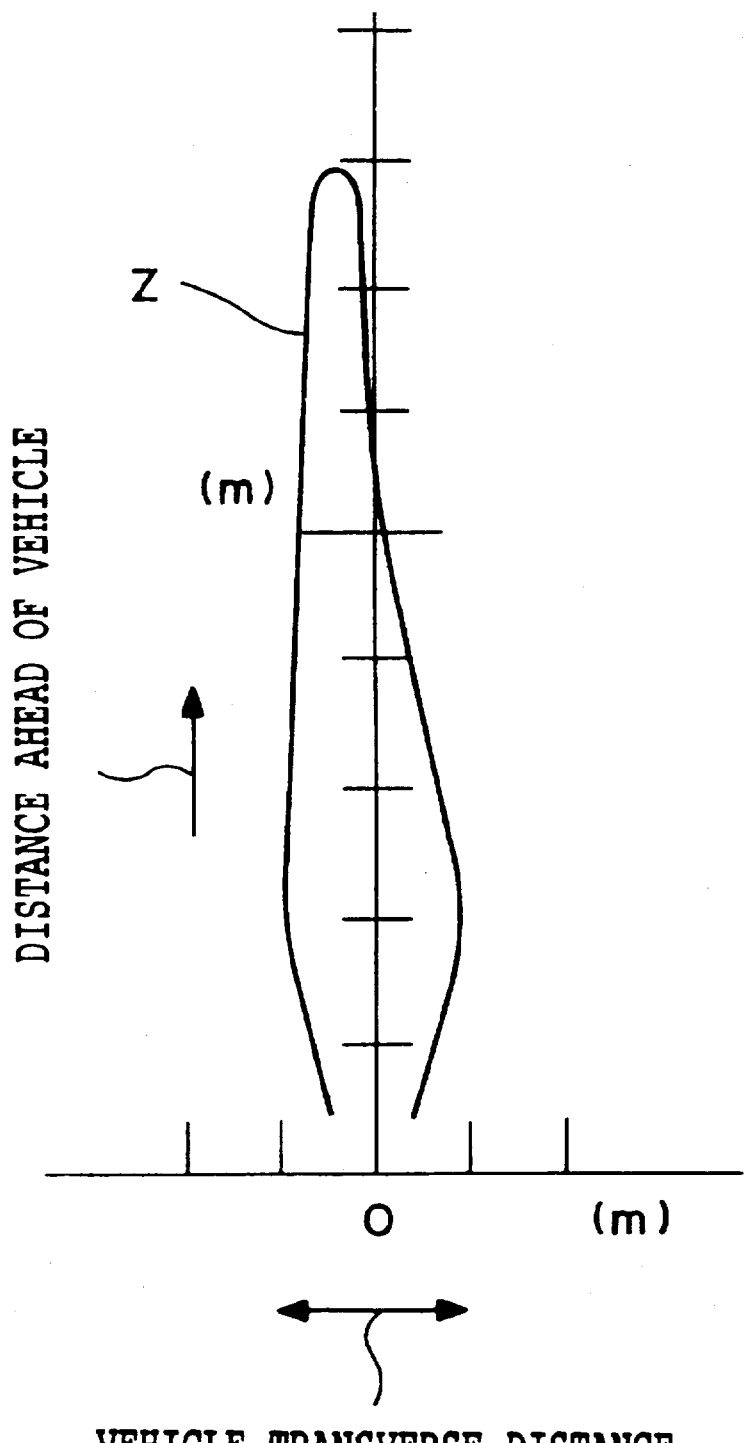
FIG. 11 is an image view illustrating an initial light distribution pattern used as the reference.

A light distribution pattern Z shown in FIG. 11 shows a light distribution pattern placed in an initial state, which is used as the reference for changing a light distribution by shifting the reflector 38 and the bulb 32 to be described later from side to side. For example, a light distribution pattern Z having a luminous intensity of 5 lux is shown in FIG. 11.

Figure 12:
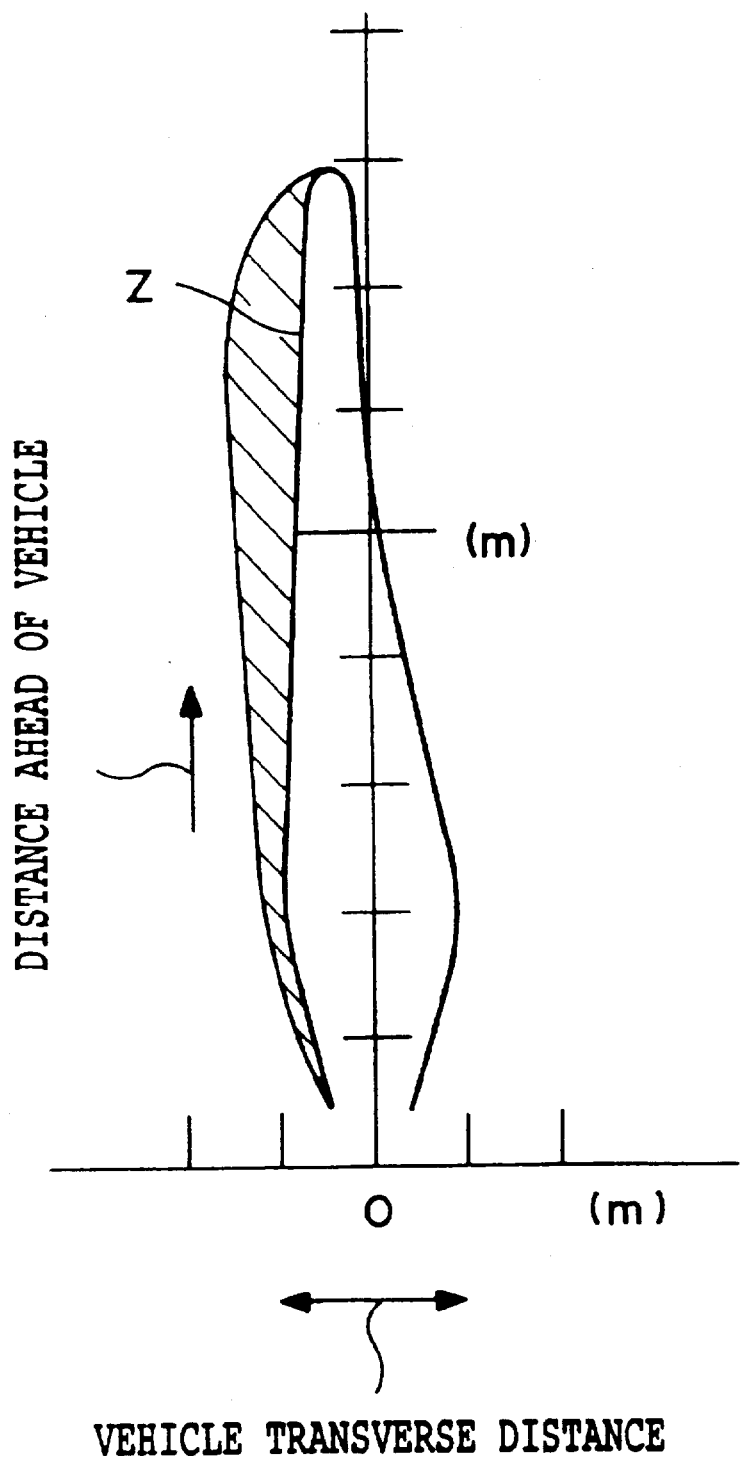
FIG. 12 is an image view depicting a light distribution pattern responsive to on left-turning.

FIG. 12 shows a light distribution pattern Z obtained by shifting the reflector 38 and the bulb 32 so as to change the expansion of a light distribution to the left. The range in which the light distribution expands, is indicated by a sloped line.

Figure 13:
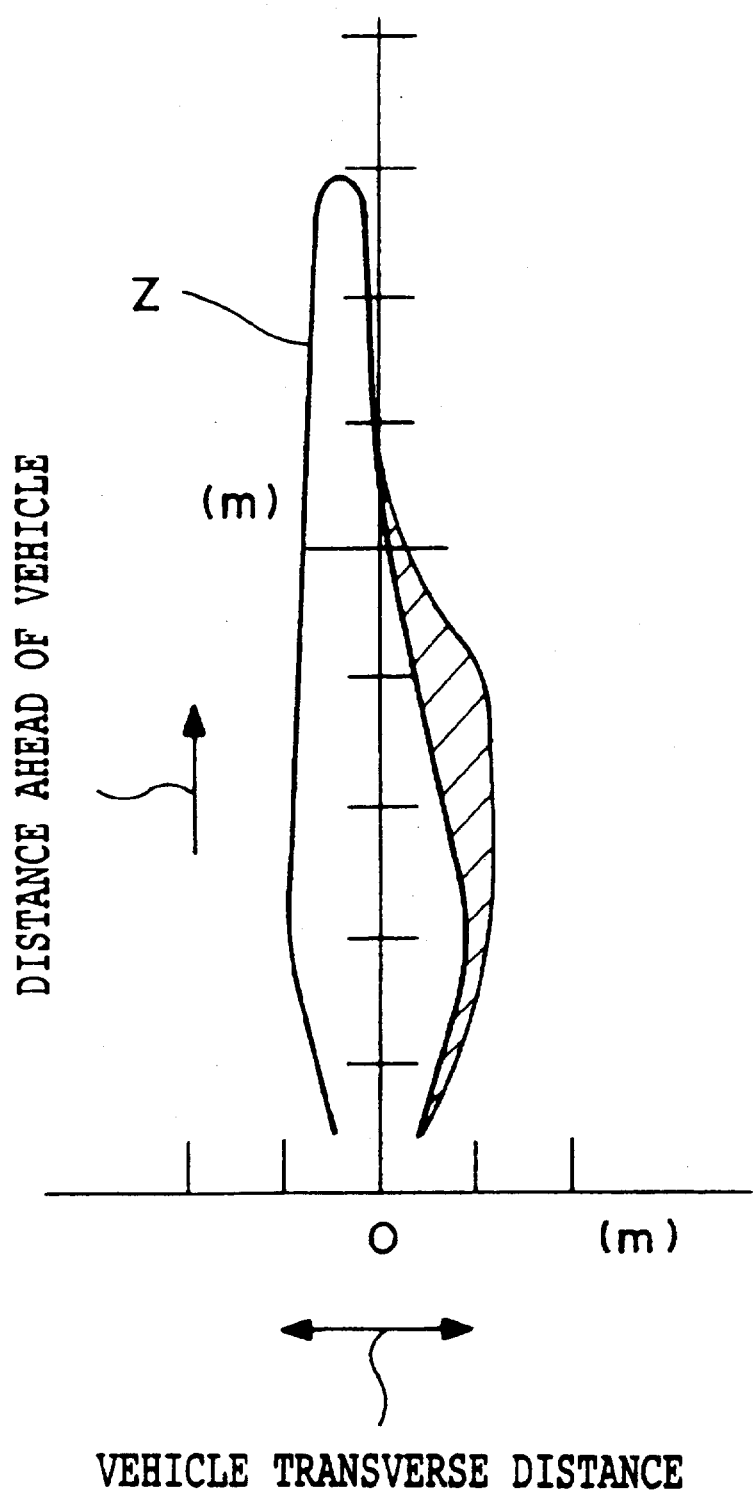
FIG. 13 is an image view showing a light distribution pattern responsive to on right-turning.

FIG. 13 illustrates a light distribution pattern Z obtained by shifting the reflector 38 and the bulb 32 so as to change the expansion of light distribution to the right. The range in which the light distribution expands is indicated by an oblique line.

In the present embodiment, the state of the light distributions formed according to the positions of rotation of the first and second light-proof portions 40A and 40B of the shade 40 and the relative position of movement of the reflector 38 and the bulb 32 is roughly divided into plural forms in advance. The respective states of light distributions are defined as the light distribution pattern Z. The light distribution pattern Z can be associated with a desired state of light distribution by storing the respective positions of the first and second light-proof portions 40A and 40B of the shade 40 and the respective positions of the reflector 38 and the bulb 32.

(Image Processing Device 23)

A method of determining a deviation angle φ based on an image signal outputted from the optic or image sensor 22 by using the image processing device 23 will next be described in brief.

The present inventors have performed an experiment for detecting a position to be viewed by a driver while the vehicle 10 is running. According to the experiment, when the vehicle 10 is driven at a plurality of running speeds (vehicle speed V) along a test course 122 (see FIG. 10) having a plurality of configurations of the forward roadway (ongoing road), the distance between the vehicle 10 and the position to be viewed by the driver is determined from the direction of a driver's line of sight (corresponding to an angle formed by the running direction of the vehicle 10 and the direction of the line of sight) and the vehicle speed V. According to the experiment, the present inventors could obtain the result that the driver would view the distance of the vehicle 10 reaching after a predetermined time irrespective of the configuration of the forward roadway and the vehicle speed V. Thus, if the configuration of the forward roadway of the test course 122 and the vehicle speed V can be specified, then the position to be observed by the driver can be determined.

Figure 14:
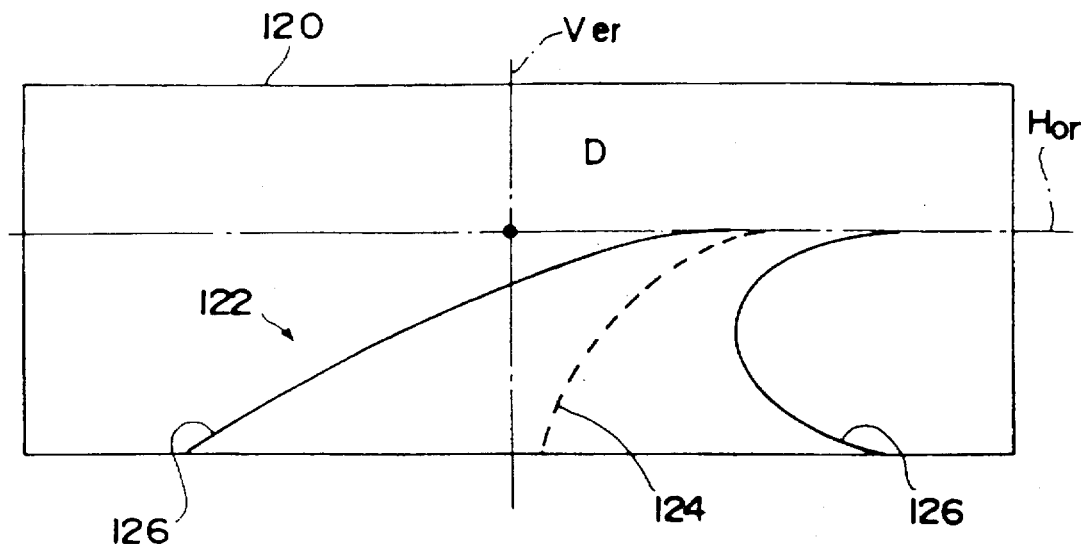
FIG. 14 is an image view of an image signal outputted from the optic or image sensor.

An image 120 produced by photographing the test course 122 on which the vehicle 10 travels, using the optic or image sensor 22 is shown in FIG. 14. The test course 122 has two lanes, which are respectively running traffic lanes along which the vehicle 10 runs in the same direction. A line 124 is provided as the boundary between the respective lanes and curbs 126 are used as the boundaries between the test course 122 and portions other than the test course 122.

In the image 120, a point D is plotted at a position corresponding to the height and direction of a driver's line of sight L (see FIG. 10) parallel to the test course 122 and coincident with the running direction of the vehicle 10. The point D is defined as the reference of the image 120 which varies according to the direction of the vehicle 10 and is photographed by the optic or image sensor 22. A horizontal line on the image 120, which passes through the point D, is defined as a line Hor, which matches with the horizon while the vehicle 10 is running stably. A straight line, which meets at a right angle to the line Hor and passes through the point D, is defined as a line Ver. The lines Hor and Ver can be used to correct the image 120 when the image 120 is subjected to image processing due to the tossing or the like of the vehicle 10.

The image 120, which has been photographed by the optic or image sensor 22, is input to the image processing device 23. The image processing device 23 effects an image process on the image 120 based on a plurality of image data indicative of pixel positions on the image 120 relative to the line 124 and the curbs 126 to thereby form an image 130 as seen from above the test course 122 (see FIG. 15). The shape of the road can be specified by the image 130.

Figure 15:
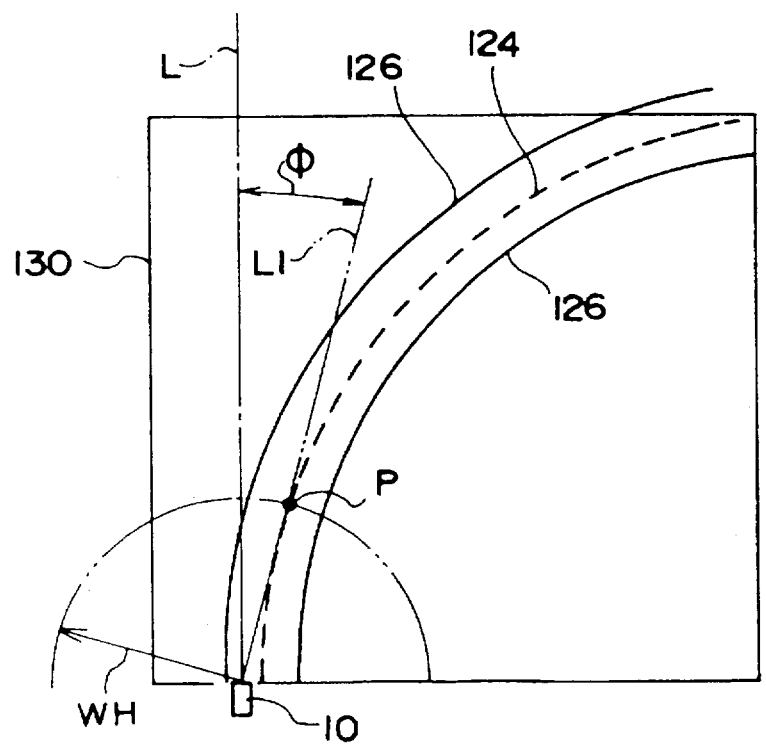
FIG. 15 is a view showing an image obtained by processing the image shown in FIG. 14 with an image processing device.

As shown in FIG. 15, the distance to be viewed by the driver at the contemporaneous speed V of the vehicle 10 as expressed in the following equation (1) corresponds to a portion on a view position WH (on the perimeter of a circle whose radius is WH) after a predetermined time interval has elapsed from the position of the vehicle 10 which is running at the vehicle speed V. The test course 122 shows the configuration of the forward roadway determined by the image processing device 23. The driver normally visually observes the direction corresponding to the determined configuration of the forward roadway. In the present embodiment, the configuration of the line 124 provided along the configuration of the test course 122 is specified as the configuration of the forward roadway in a simple manner. Accordingly, a point P where the line 124 and the radius WH intersect, can be specified as a driver's view position. Although the configuration of the forward roadway is specified by the line 124, a position (locus) along which the vehicle runs within a vehicle lane, may be imagined so as to specify the configuration of the forward roadway at its position.

$$WH = T \cdot (10/36) \cdot V \quad (1)$$

where T: predetermined time interval (unit: s)
V: vehicle speed (unit: km/h)
WH: view distance (unit: m)

A straight line, which passes through the point P, corresponds to the direction substantially coincident with the direction (corresponding to a driver's line of sight L1) that the driver visually observes according to the configuration of the forward roadway. Accordingly, the angle formed between the driver's line of sight L (see FIG. 10) coincident with the running direction of the vehicle 10 and the line of sight L1 corresponding to the configuration of the forward roadway becomes a deviation angle φ indicative of an angle at which the direction of the driver's line of sight varies according to the running state (vehicle speed V) of the vehicle 10 and the configuration of the forward roadway.

Figure 19:
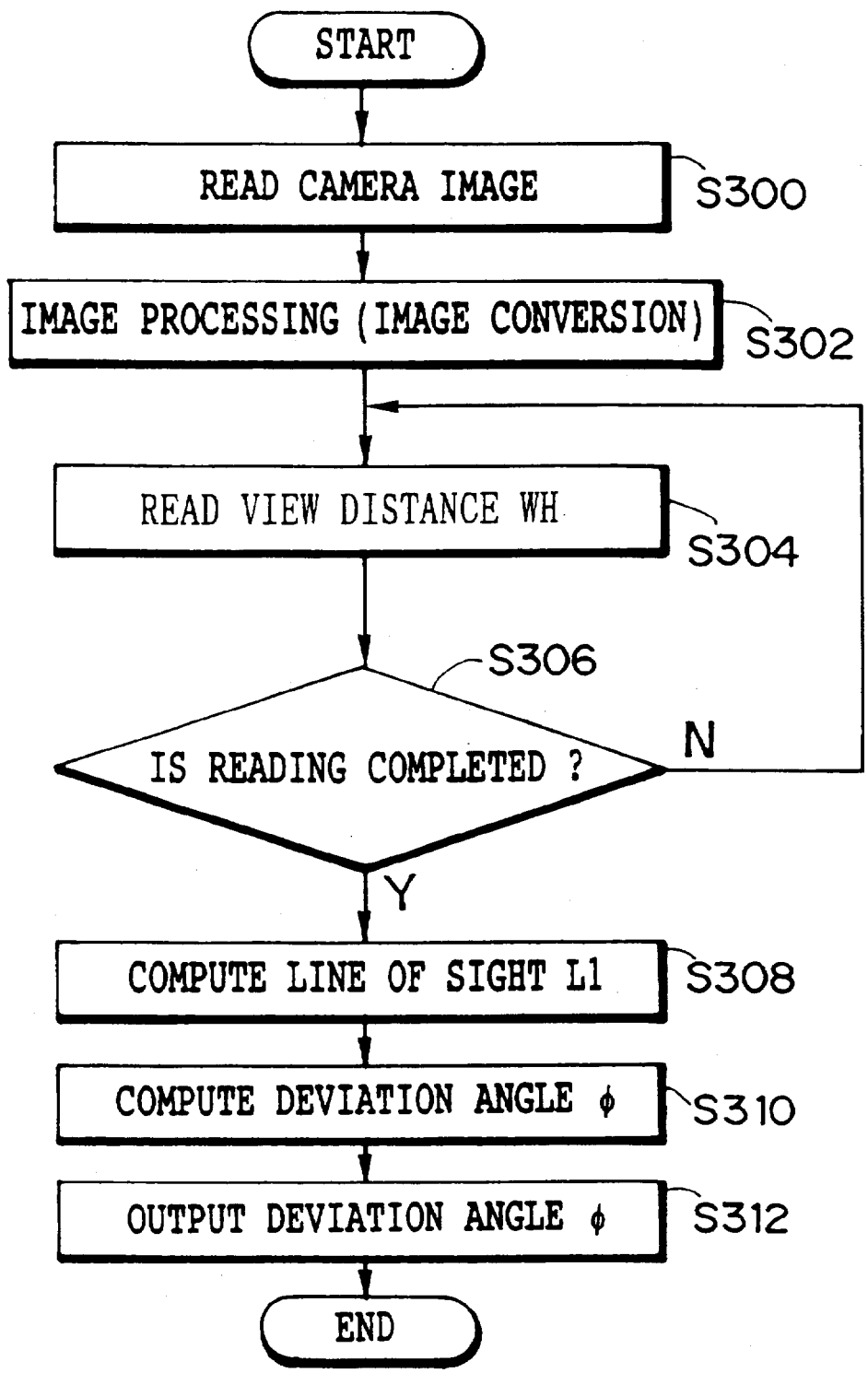
FIG. 19 is a flowchart for describing an image processing routine executed by one embodiment.

When an image read signal is input from the control apparatus 48 to the image processing device 23, a routine shown in FIG. 19, for computing the deviation angle φ is executed. When the present routine is carried out, the routine procedure proceeds to S300 where the pictorial image 120 (see FIG. 14) of the image ahead of the vehicle 10, which has been photographed by the optic or image sensor 22, is read.

When the reading of the image 120 is finished, the routine procedure proceeds to S302 where the image 120 is subjected to the image processing based on the plurality of image data indicative of the pixel positions on the image 120 relative to the line 124 and the curbs 126, whereby the image 120 is converted into the image 130 corresponding to a plane figure as seen from above the test course 122 (see FIG. 15).

When the conversion of the image 120 to the image 130 is terminated, the view position WH, which has been determined from the aforementioned equation (1) and which corresponds to the distance of the vehicle 10 reaching at the present vehicle speed V after the predetermined time from the position of the vehicle 10, is read (S304 and S306).

In the next S308, the driver's line of sight L1 is determined on the image 130. Namely, for example, the point P of intersection of the center line 124 and the radius WH, which is capable of specifying the configuration of the forward roadway on the converted image 130, is determined with the read view distance WH as the radius to thereby obtain the driver's view position (corresponding to coordinates of the point P). The straight line, which passes through the point P and the vehicle 10, becomes a straight line extending in the direction substantially coincident with the direction (driver's line of sight L1) that the driver visually observes according to the configuration of the forward roadway.

When the computation of the line of sight LI is completed, the deviation angle φ is determined in S310. Namely, the angle formed between the line of sight L coincident with the running direction of the vehicle 10 and the line of sight L1 corresponding to the configuration of the forward roadway becomes a deviation angle φ formed in the direction of the driver's line of sight, which varies from the running direction of the vehicle 10 according to the configuration of the forward roadway. Incidentally, the driver's view position is considered inclusive of the running state (vehicle speed V) of the vehicle 10 as expressed in the equation (1).

In the next S312, the determined deviation angle φ is outputted to the control apparatus 48 to complete the present routine.

Thus, since the image coincident with the image, which has been photographed by the optic or image sensor and visually observed by the driver, is converted into the plane image to recognize the configuration of the forward roadway, the deviation angle φ corresponding to the angle formed by the running direction of the vehicle 10 and the direction of the driver's line of sight can be easily determined based on the driver's view distance according to the configuration of the forward roadway.

In the present embodiment, a fuzzy inference may be used to compute a controlled variable for controlling the light distributions of the head lamps 18 and 20.

The operation of the present embodiment will be described below.

A driving abilities determining routine will first be described with reference to FIG. 16.

Figure 16:
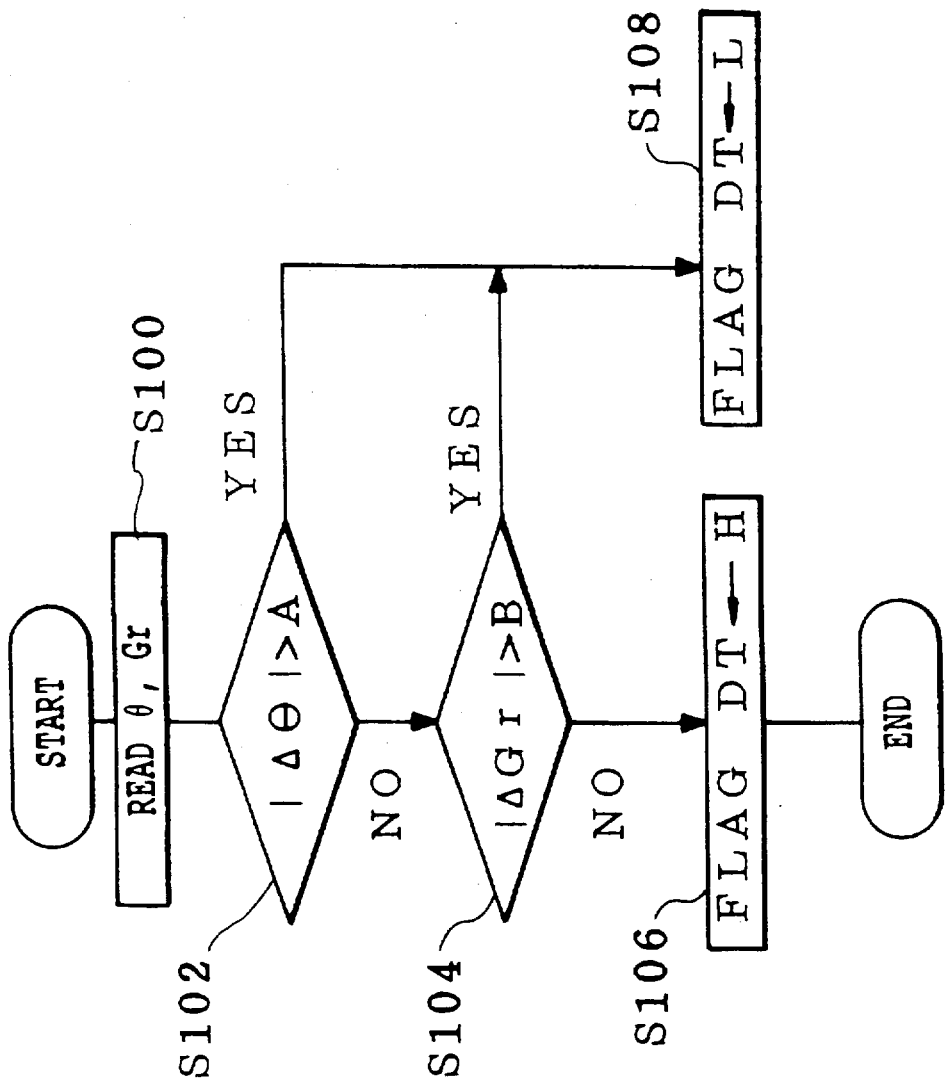
FIG. 16 is a flowchart for describing a driving abilities determining routine executed by one embodiment.

The driving abilities determining routine shown in FIG. 16 is executed every predetermined time interval. Upon execution of the routine for every occasion, the contemporaneous steering angle θ and the contemporaneous lateral acceleration Gr are respectively read from the steering angle sensor 68 and the lateral acceleration sensor 71 in Step S100 (hereinafter called ⌈S100⌋ and other steps are the same). The read steering angle θ and lateral acceleration Gr are stored in RAM.

In S102, a steering-angle variation speed Δθ is next calculated by subtracting the previous value (stored in RAM in advance) from the present value of the steering angle θ. It is also judged or determined whether the condition that the absolute value of the steering-angle variation speed is greater than a threshold value A, is produced at relatively frequent intervals (for example, the number of times such a condition occurs within a predetermined time interval, is greater than the threshold value A). Assuming that the condition is not relatively often produced this time, the result of decision is found to be No and the routine procedure proceeds to S104.

In S104, a lateral acceleration variation speed ΔGr is calculated by subtracting the previous value (stored in RAM in advance) from the present value of the lateral acceleration Gr. It is also judged whether the condition that the absolute value of the lateral acceleration variation speed ΔGr is greater than a threshold value B, is produced at relatively frequent intervals (e.g., the number of times such a condition occurs within a predetermined time interval, is greater than the threshold value). Assuming that the condition is no t relatively frequently produced this time, the result of decision is found to be NO and the routine proceeds to S106.

In S106, a driving abilities determining flag (FLAG DT) is rendered high (H). The execution of the present routine is completed once in this way. Namely, it is estimated that the driving abilities is high this time. Thus, the driving abilities determining flag is rendered high.

On the other hand, when the condition that the absolute value of the steering-angle variation speed Δθ is greater than the threshold value A, occurs at frequent intervals, the answer is judged to be YES in S102 and the routine procedure proceeds to S108. When the condition that the absolute value of the lateral acceleration variation speed ΔGr is greater than the threshold value B, is developed at relatively frequent intervals, the answer is judged to be YES in S104 and the routine procedure proceeds to S108 even in this case.

In S108, the driving abilities determining flag (FLAG DT) is rendered low (L). The execution of the present routine is completed once in this way. Namely, the driving abilities is estimated to be low this time. Thus, the driving abilities determining flag is made low.

Control routines for controlling the light distributions of the head lamps 18 and 20 will next be described with reference to FIGS. 17A and 17B and FIGS. 18A and 18B.

Figure 17A:
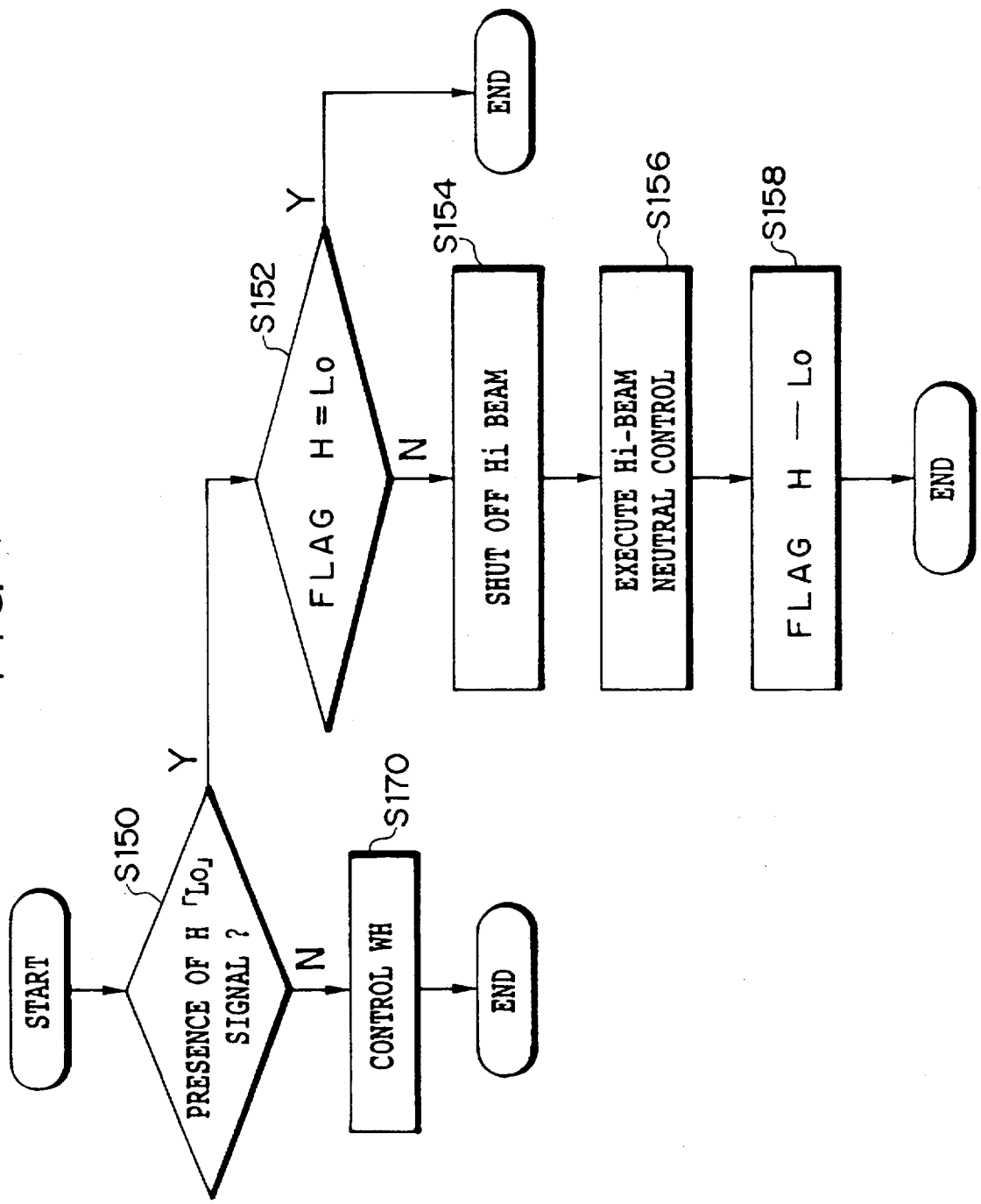
FIG. 17A is a flowchart for describing a main routine executed by one embodiment.

When a driver first turns on a light switch (not shown) attached to a vehicle to light the head lamps 18 and 20, a control main routine shown in FIGS. 17A and 17B is executed every predetermined time interval.

When the present main control routine is executed, it is judged in S150 whether an oncoming vehicle and a forward-ongoing vehicle exist and a low-beam head lamp switching signal (H ⌈Lo⌋ signal) is input or present. If it is judged in S150 that the low-beam head lamp switching signal exists, then the routine procedure proceeds to S152 where it is judged whether a head lamp changeover flag (FLAG H) is low (Lo).

If the answer is found to be NO in S152, then the routine procedure proceeds to S154 where high-beam head lamps are turned off. In S156, the high-beam head lamps are returned to neutral, and the next control rise is made fast on the average and the driver gets ready for lighting under a manual operation. Next, the head lamp beam changeover flag (FLAG H) is rendered low (Lo) in S158.

When the head lamp beam changeover flag (FLAG H) becomes low (Lo), another subroutine is executed. As shown in FIG. 17B as an example, a deviation angle φ is read in S160 and a deviation angle for a low beam is controlled in S162. Thereafter, an upper bright-dark limit value for a low-beam head lamp is read from an upper bright-dark limit angle map in S164. Next, the upper bright-dark limits for the low-beam head lamp are controlled in S166 and the present routine is finished.

In this case, the deviation angle φ is calculated from a view point and each upper bright-dark limit is controlled based on other signals about the positions or the like of the oncoming vehicle and the forward-ongoing vehicle (see Japanese Patent Application Laid-Open No. 6(1994)-267304 which discloses the prior art).

On the other hand, when it is judged in S150 that the low-beam head lamp switching signal (H ⌈Lo⌋ signal) is absent, i.e., when the oncoming vehicle and the forward-ongoing vehicle are not running or when no glare is applied to the opposing driver even if the oncoming vehicle and the forward-ongoing vehicle are running, view distance control (WH control) for performing automatic switching between high and low beams of each head lamp is executed in S170.

Figure 18A:
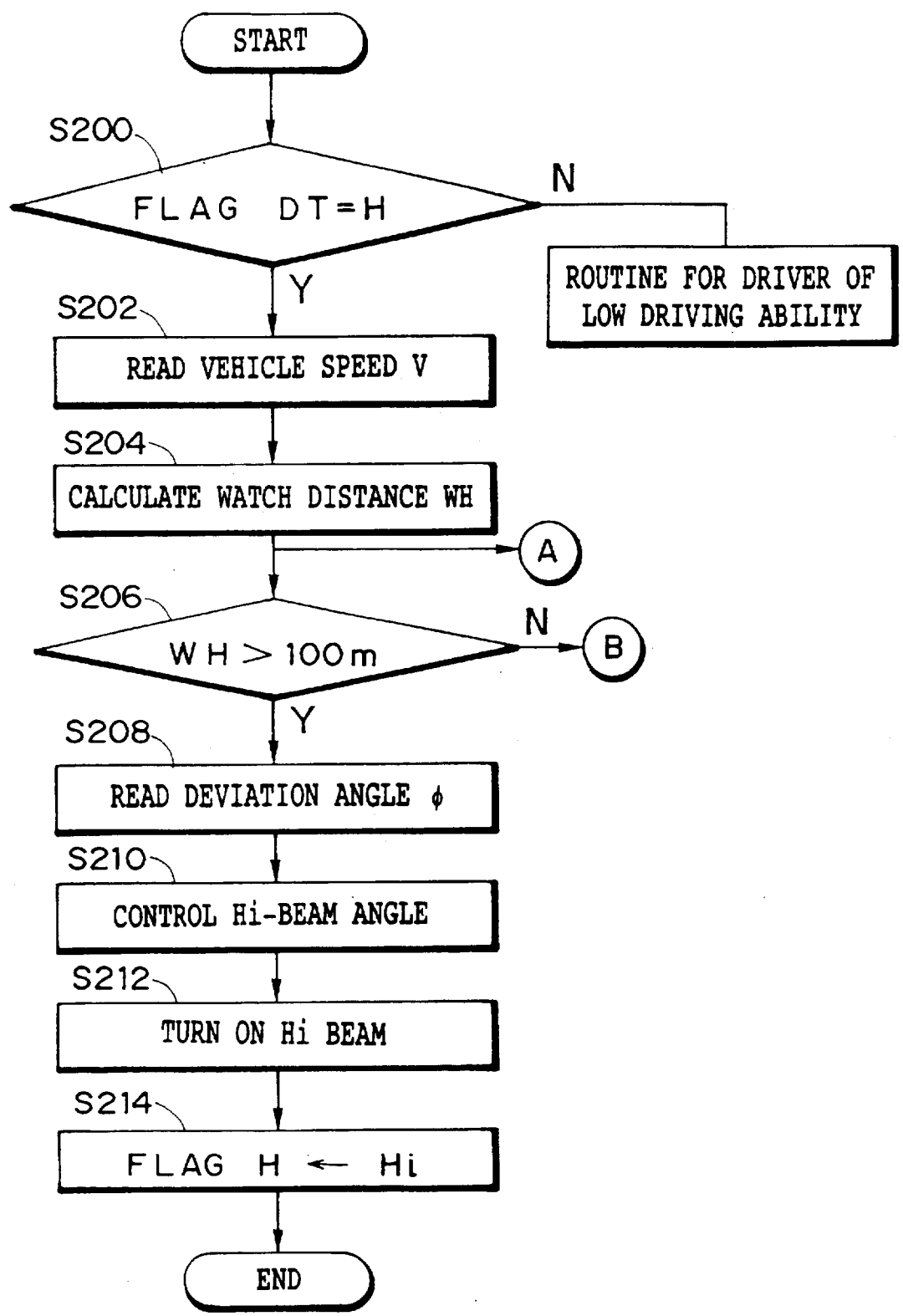
FIGS. 18A, 18B and 18C are a flowchart for describing a view position control routine executed by one embodiment.
Figure 18B:
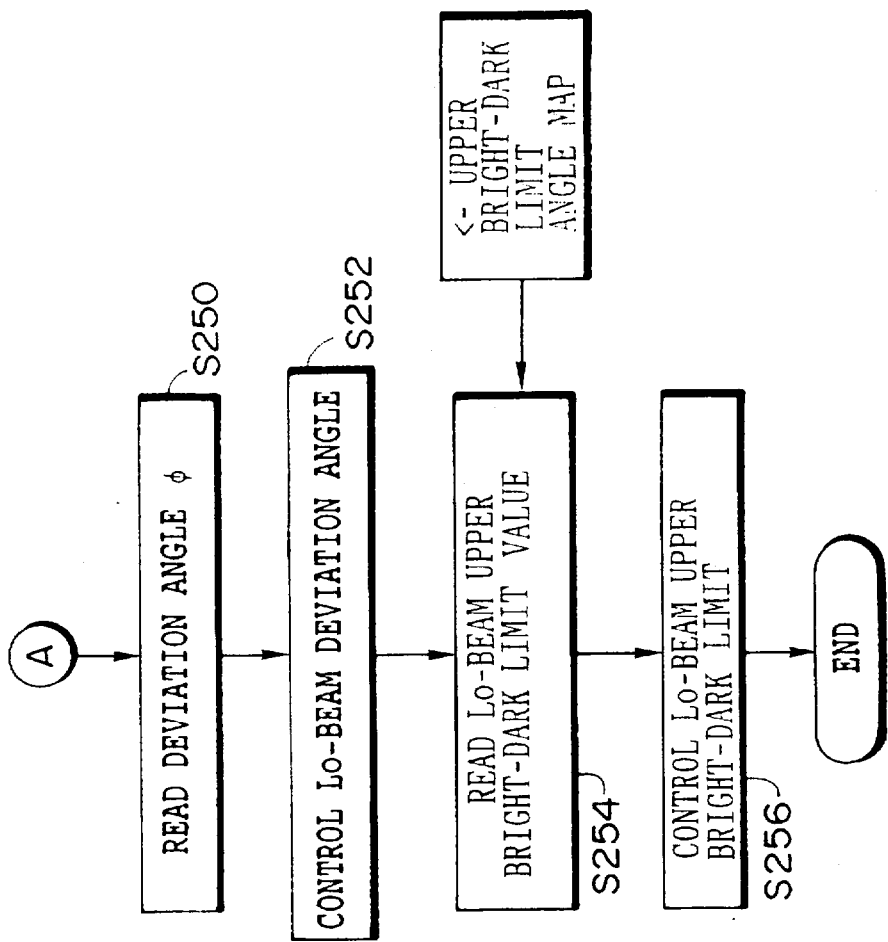
Figure 18C:
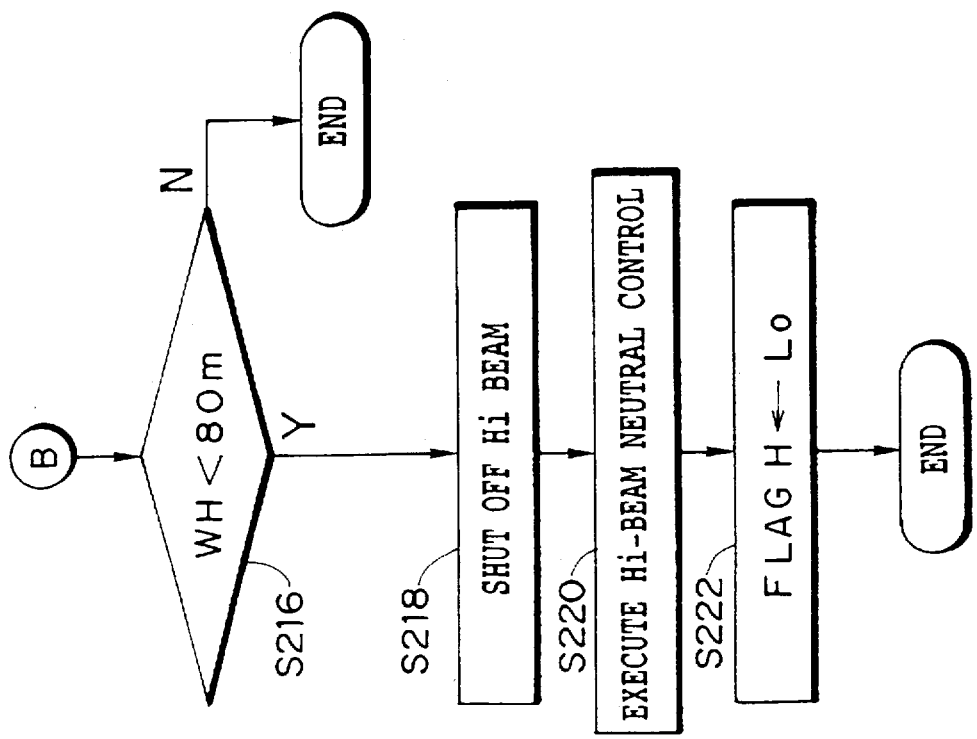

According to the view distance control as shown in FIGS. 18A and 18B, it is judged in S200 whether the driving abilities determining flag (FLAG DT) is high (H). If the answer is found to be YES in S200, then the routine procedure proceeds to S202 for executing a routine used for a driver having high driving abilities. After a vehicle speed V has been read, the routine procedure proceeds to S204 where a view distance WH for the driver having the high driving abilities is calculated and the calculated view distance WH is outputted to the image processing device 23. In this case, the view distance WH is obtained from the equation (1) with the predetermined time interval T as long, e.g., 5s.

In the next S206, it is judged whether the calculated view distance WH exceeds 100 m. If the answer is found to be YES in S206, then the routine procedure proceeds to S208. In S208, the deviation angle φ calculated by the image processing device 23 is read and the routine procedure proceeds to S210. In S210, a controlled variable of light distribution is computed and the reflector 38 for the high-beam head lamp is rotated according to the computed controlled variable of light distribution to thereby perform control on a deviation angle for the high beam.

Thereafter, the high beam is turned on in S212 and the head lamp beam changeover flag (FLAG H) is rendered high (H).

Simultaneously, the light distribution of the low-beam head lamp is controlled in S250 through S256 (identical to S160 through S166). Described specifically, the view distance WH for the low-beam head lamp is set to 80 m to control the deviation angle φ and each of the upper bright-dark limits is controlled to a constant.

Figure 20:
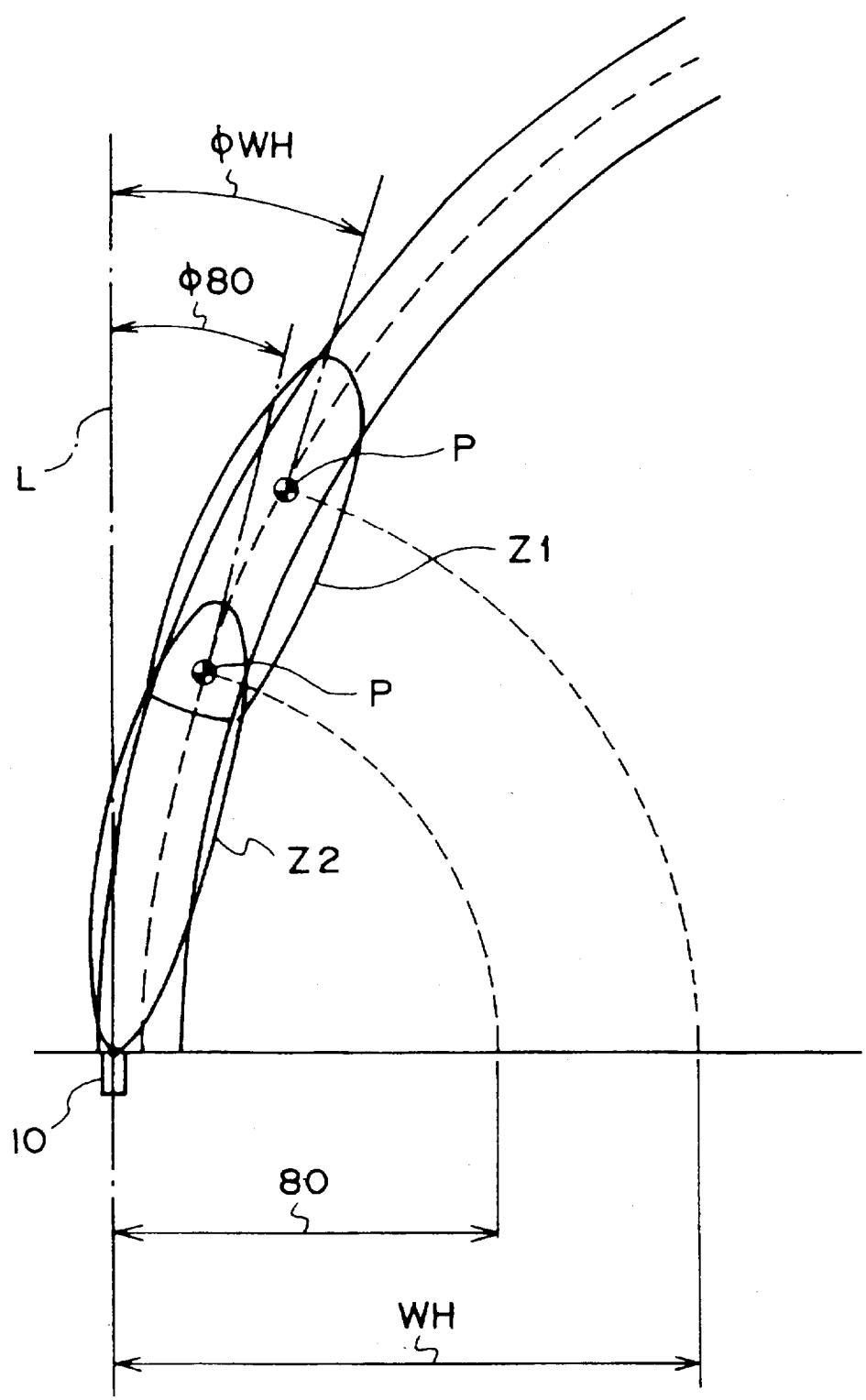
FIG. 20 is an image view showing a view position and light distribution patterns of head lamps, both of which are obtained in one embodiment.

Thus, since a high-beam head lamp light distribution pattern Z1 shown in FIG. 20 is changed into a low-beam head lamp light distribution pattern Z2, the continuity of each head lamp can be ensured upon high-beam shutoff.

On the other hand, when it is judged in S206 that the calculated view distance WH does not exceed 100m, the routine procedure proceeds to S216. It is judged in S216 whether the calculated view distance WH is smaller than 80 m. If the answer is found to be YES in S216, then the high-beam head lamp is turned off in S218. In S220, the high-beam head lamp is returned to neutral and the next control rise is made fast on the average and the driver gets ready for lighting under a manual operation. Next, the head lamp beam changeover flag (FLAG H) is rendered low (Lo) in S222 and the routine is finished.

If it is judged in S200 that the driving abilities determining flag (FLAG DT) is not high (H), then a routine used for a driver having low driving abilities is executed. In this case, the predetermined time interval T is set to a short time interval, for example, 2s in the equation (1) and the view distance WH is set so as to be shorter than the view distance WH for the driver having the high driving abilities.

Figure 21:
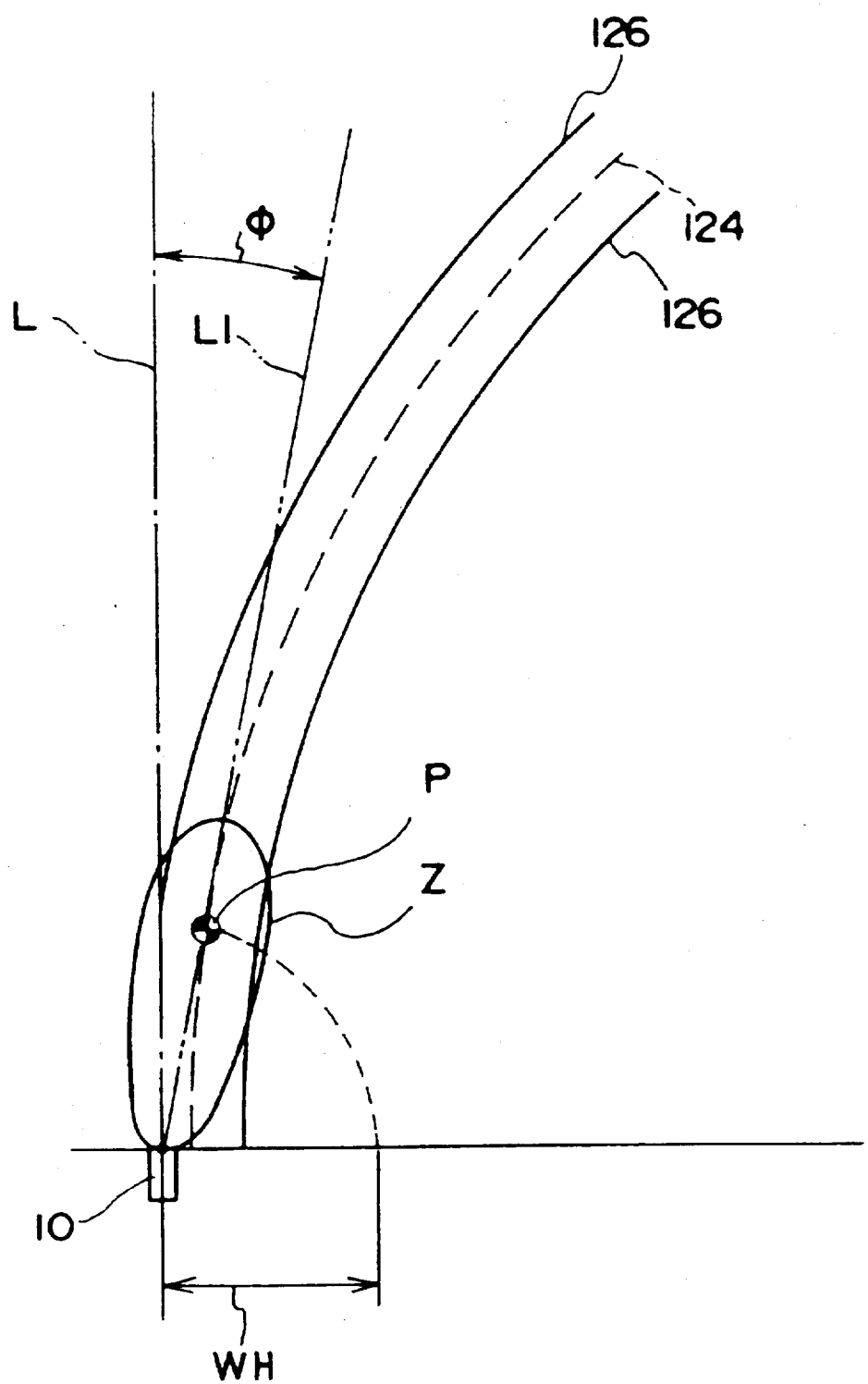
FIG. 21 is an image view illustrating a view position of a driver with low driving abilities and light distribution patterns of head lamps.
Figure 22:
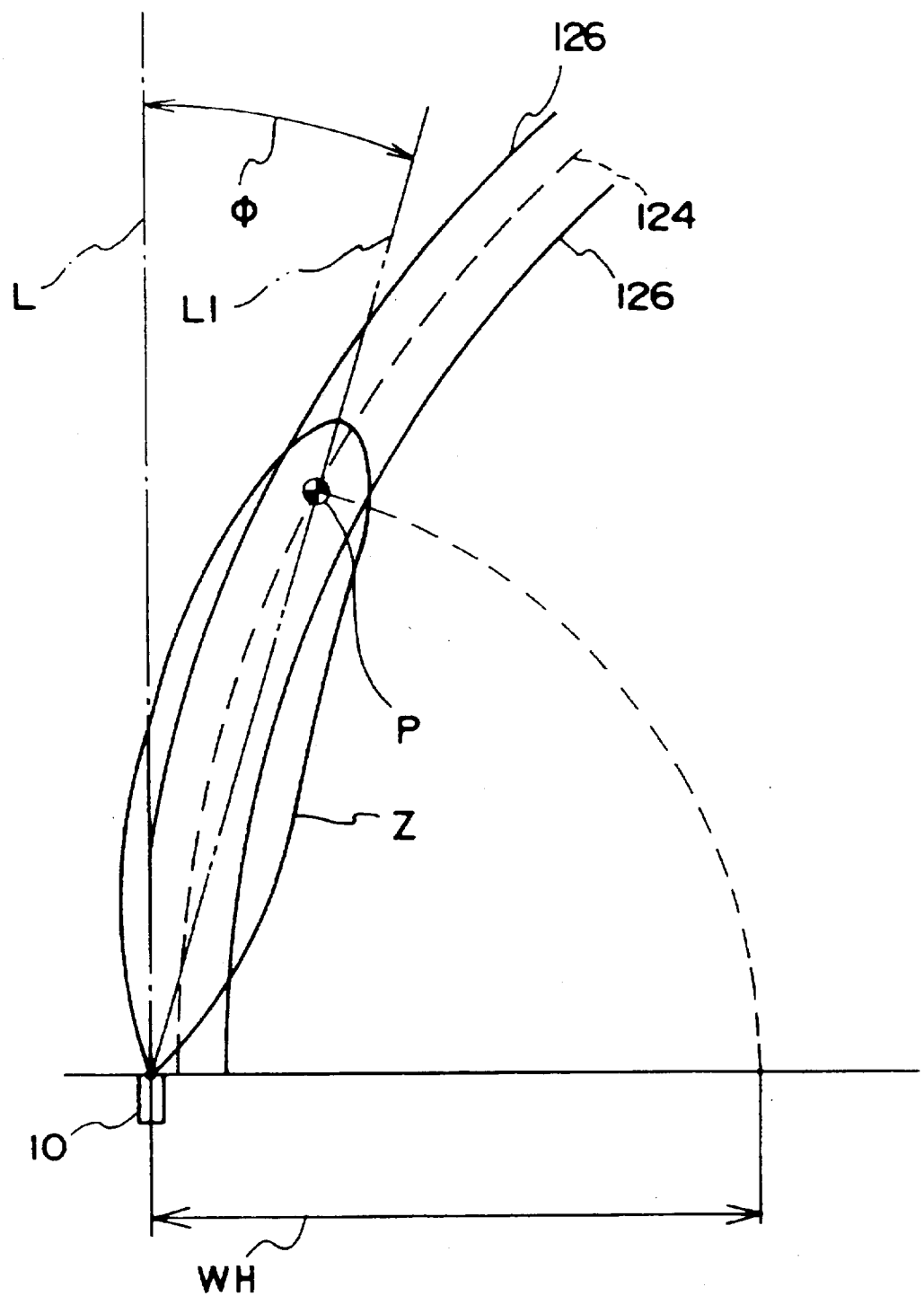
FIG. 22 is an image view showing a view position of a driver with high driving abilities and light distribution patterns of head lamps.

As a result, a view distance WH and a head lamp light distribution pattern Z for the driver of low driving abilities both of which are shown in FIG. 21 and a view distance WH and a head lamp light distribution pattern Z for the driver of high driving abilities both of which are shown in FIG. 22, respectively vary. Further, the light can be reliably applied to the position to be observed by the driver during the running of the vehicle according to the driving abilities of the driver.

Control on light distributions of the head lamps over a curved path such as an S-shaped curve or the like will next be described with reference to FIGS. 23A and 23B and FIGS. 24 and 25.

Figure 23A:
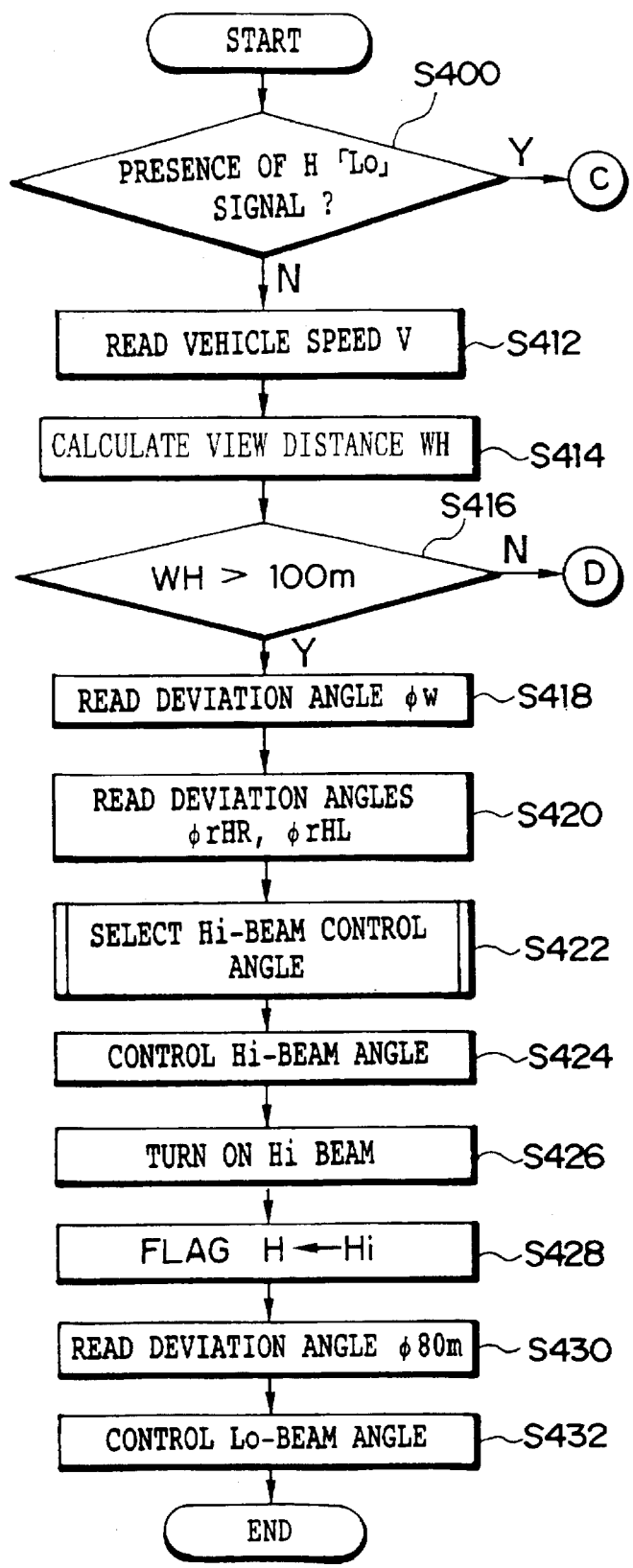
FIGS. 23A and 23B are portions a flowchart for describing control on light distributions of head lamps over a curved path such as an S-shaped curve or the like, which is executed by one embodiment.
Figure 23B:
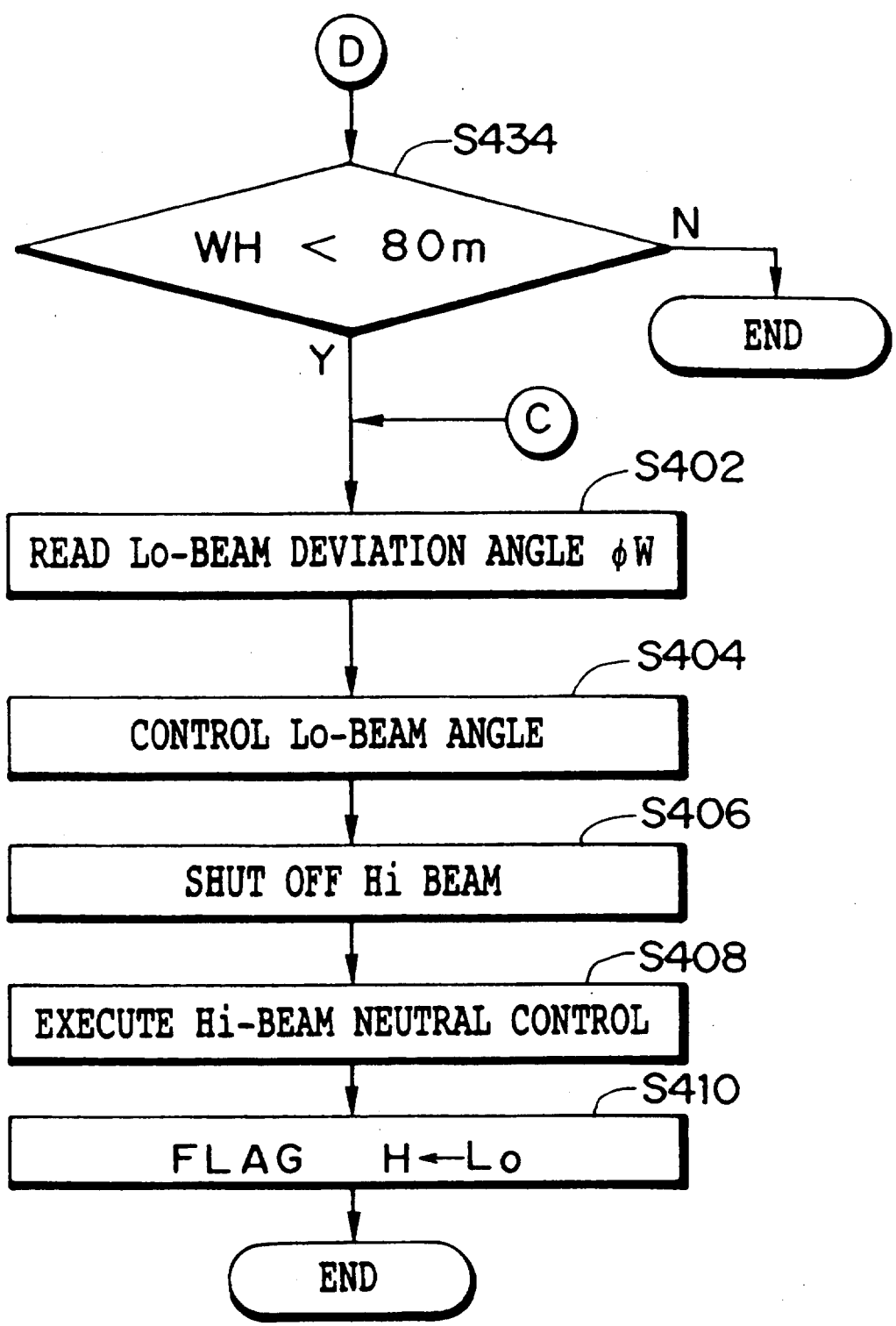
Figure 24:
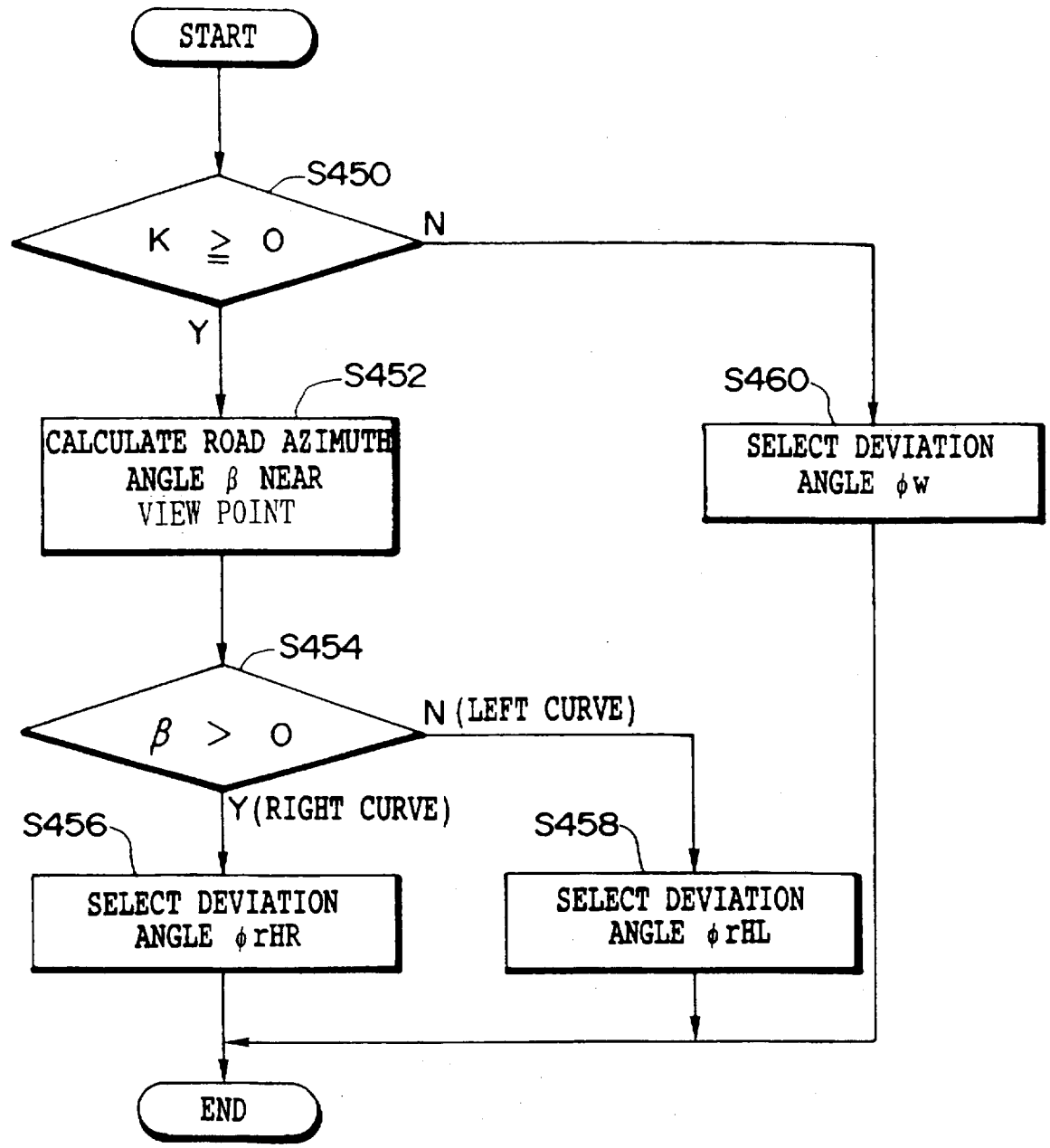
FIG. 24 is a flowchart for describing a subroutine to control light distributions of head lamps over a curved path such as an S-shaped curve or the like, which is executed by one embodiment.

When the vehicle moves close to the curved path such as the S-shaped curve or the like, a control main routine shown in FIGS. 23A and 23B is executed.

When the present control routine is executed, it is judged in S400 whether an oncoming vehicle and a forward-ongoing vehicle exist and a low-beam head lamp switching signal (H⌈Lo⌋ signal) is present. If the answer is found to be Yes in S400, then the routine procedure proceeds to S402 where a low-beam deviation angle φ is read. In S404, the low-beam deviation angle φ is controlled. In the case of the presence of the oncoming vehicle, upper bright-dark limits are controlled in accordance with another flow.

Next, the routine procedure proceeds to S406 where a high-beam head lamp is turned off. In S408, the high-beam head lamp is returned to neutral, and the next control rise is made fast on the average and the driver gets ready for lighting under a manual operation. Next, a head lamp beam changeover flag (FLAG H) is rendered low (Lo).

On the other hand, when the answer is found to be No in S400, i.e., when the oncoming vehicle and the forward-ongoing vehicle are not being driven or when no glare is applied to the opposing driver even if the oncoming vehicle and the forward-ongoing vehicle are running, the routine procedure proceeds to S412 where a vehicle speed V is read. Thereafter, a view distance WH for the driver having the high driving abilities is calculated and the calculated view distance WH is outputted to the image processing device 23 in S414. According to the present control routine, if the vehicle speed V exceeds 72 Km/h, then a high-beam head lamp is automatically turned on to illuminate a running path ahead of 100 m or more.

Figure 25:
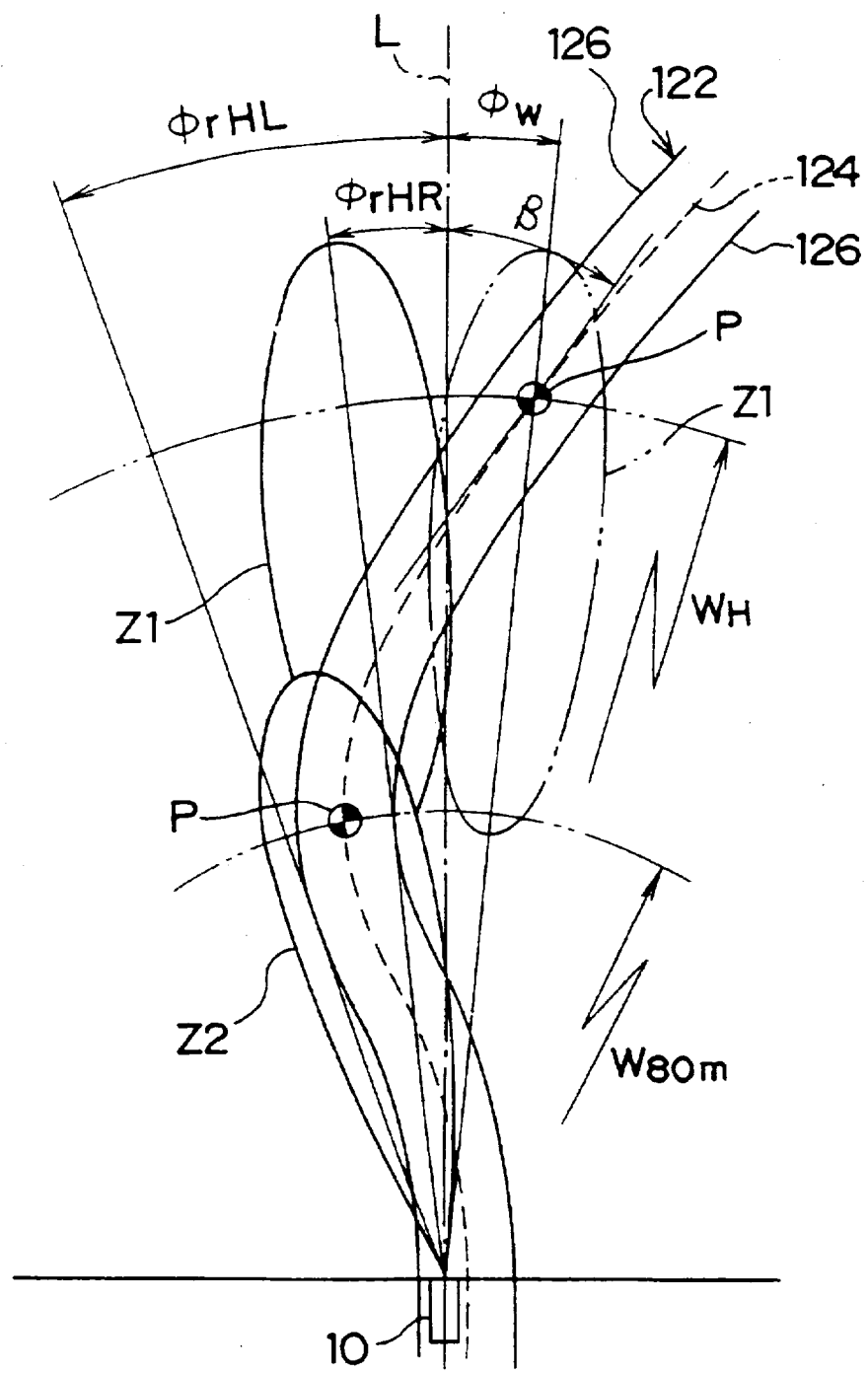
FIG. 25 is an image view showing view positions and light distribution patterns of head lamps with respect to a curved path such as an Sshaped curve or the like, both of which are obtained in one embodiment.
Figure 26:
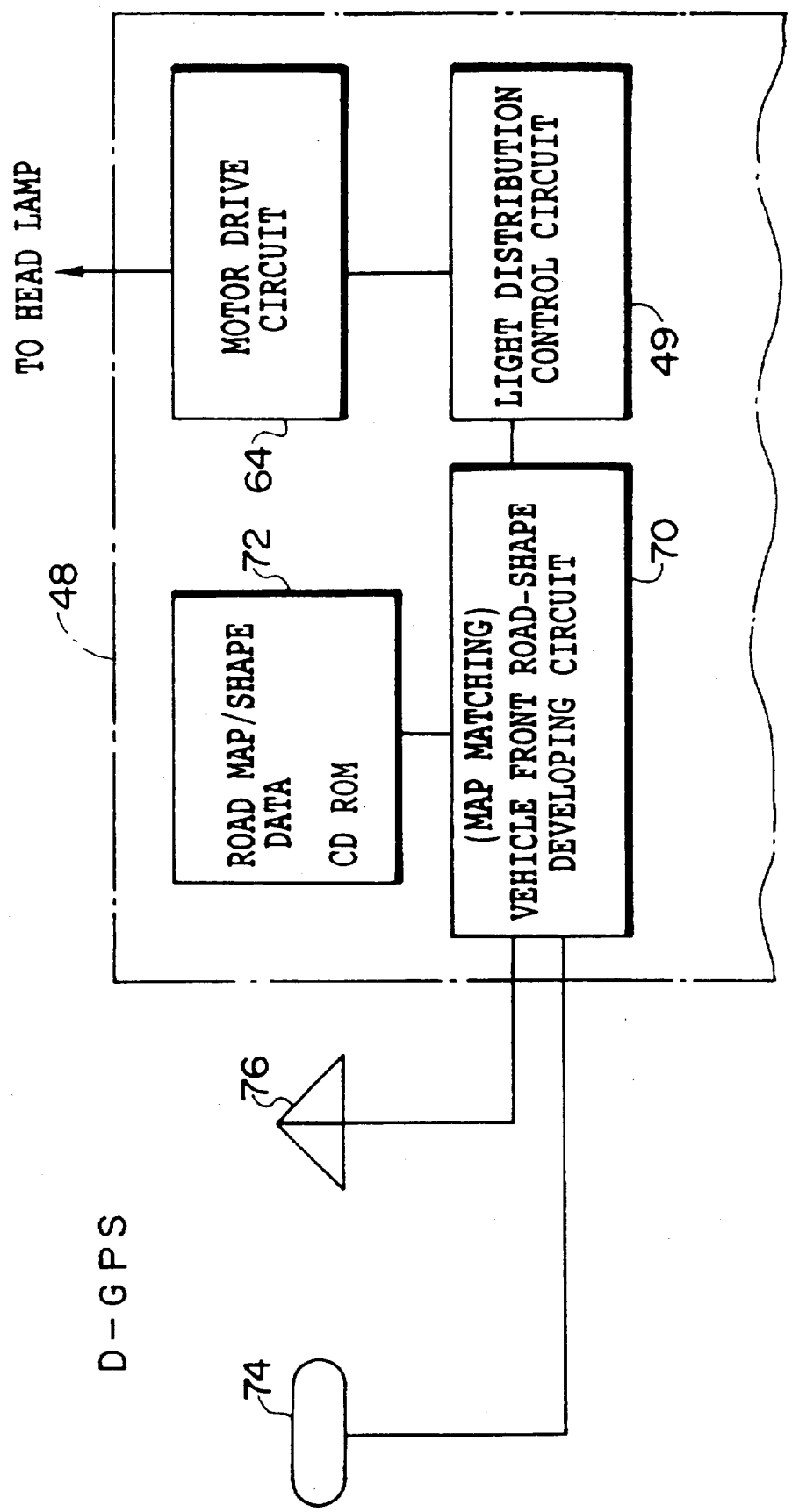
FIG. 26 is a block diagram illustrating a part of a schematic configuration of an apparatus for controlling a light distribution of each of head lamps in response to a received D-GPS signal.

In the next S416, it is judged whether the calculated view distance WH exceeds 100 m. If the answer is found to be Yes in S416, then the routine procedure proceeds to S418. In S418, a deviation angle φw calculated by the image processing device 23 is read and the routine procedure proceeds to S420. In S420, angles φrHR and φrHL with respect to both the outermost lines 126 lying within a plane of a road (running or driving course) 122 as shown in FIG. 25 are read and the routine procedure proceeds to S422.

In the case of a general road, for example, both the outermost lines 126 lying within the plane of the road 122 are set to both the outermost lines inclusive of both vehicle lanes, whereas in the case of a superhighway, they are set to both the outermost lines on a one-sided vehicle lane.

The routine procedure proceeds to S422. When it is first judged in S450 that the deviation angle φw is out of the in-plane represented by the angles φrHR and φrHL, i.e., K=(φw−φrHR)×(φw−φrHL)≧0 as indicated by a flowchart shown in FIG. 24, a road direction angle or azimuth angle β in the neighborhood of a view point Wh is calculated in S452. It is next judged in S454 whether the road azimuth angle β is greater than 0. If it is judged in S454 that the road azimuth angle β is greater than 0 (right curve), then the routine procedure proceeds to S456 where the angle φrHR is selected as a high-beam control angle as shown in FIG. 25.

On the other hand, when it is judged in S454 that the road azimuth angle β is not greater than 0 (left curve), the routine procedure proceeds to S458 where the angle φrHL is selected as the high-beam control angle.

When it is judged in S450 that the deviation angle φw exists inside the angles φrHR and φrHL, i.e., K is not greater than or equal to 0 although not shown, the deviation angle φw is selected as the high-beam control angle in S460.

In S424 in FIG. 23A, a controlled variable of light distribution is computed based on the high-beam control angle selected in S422 and the reflector 38 for the high-beam head lamp is rotated according to the computed controlled variable of light distribution to control a high-beam deviation angle. Thereafter, the high beam is turned on in S426 and the head lamp beam changeover flag (FLAG H) is rendered high (Hi).

In S430, a deviation angle φ80 m is read and the view distance WH for the low-beam head lamp is set to 80 m. In S432, control on the light distribution of the low-beam head lamp is executed to illuminate a point (where a low-beam head lamp light distribution pattern Z2 shown in FIG. 25 is formed) ahead of 80 m. When the deviation angle φ80 m is out of the angles with respect to both the outermost lines 126 lying within the plane of the road 122, the same control as for the high beam is carried out.

On the other hand, when it is judged in S416 that the calculated view distance WH is not beyond 100 m, the routine procedure proceeds to S434. It is judged in S434 whether the calculated view distance WH has become less than 80 m. If the answer is found to be Yes in S434, then the high beam is shut off in S402 through S410 but the low beam is first switched to the view distance WH control. Since the low beam is controlled to WH=80 m at this time, the continuity of the light distribution can be ensured.

Further, when the view distance WH ranges from 100 m to 80 m, the high-beam angle control is continuously carried out in a hysteresis range while the high beam remains on upon turning on the high beam. When the low beam is shut off, the low-beam angle control is continuously carried out while the low beam remains on.

Thus, since the high-beam head lamp light distribution pattern Z1 is controlled to the position indicated by a solid line without being controlled to the position indicated by a chain double-dashed line in FIG. 25, a satisfactory light distribution according to the configuration of the forward roadway can be ensured even in the case of the road 122 of the S-shaped curve or the like and hence satisfactory night visibility is obtained. Since it is possible to illuminate the shoulders of the curved path, the configuration of the forward roadway can be well recognized.

The present invention has been described in detail above by the specific embodiments. However, the present invention is not limited to the embodiments. It will be apparent to those skilled in the art that other various embodiments can be applied within the spirit or scope of the invention as set forth herein.

The present embodiments are constructed so that the configuration of the forward roadway is recognized by the optic or image sensor 22. As an alternative to this, however, for example, the configuration of the forward roadway may be recognized using a differential GPS (D-GPS) because the present position of the vehicle can be specified with satisfactory accuracy by the differential GPS in recent years.

Described specifically, using a differential GPS and road map/shape data stored in a CDROM 72 provided within a control apparatus 48, a vehicle front road-shape developing circuit (map matching circuit) 70 provided within the control apparatus 48 may specify the present position satisfactorily in accuracy onto the road map/shape data obtained from the CDROM 72 in response to signals outputted from a GPS antenna 74 for receiving a GPS and an FM antenna 76 for receiving a multiplexed FM signal having a corrected value from a base station and expand or develop the shape of the road ahead of the vehicle to use the developed road shape in place of the shape of the road ahead of the vehicle, which is recognized by the optic or image sensor 22, thereby controlling the light distribution of each head lamp.

While the embodiments of the present invention, as herein disclosed, constitute a preferred form, it is to be understood that other forms might be adopted.

What is claimed is:

1. An apparatus for controlling light distribution of a head lamp of a vehicle in which performance is changeable, comprising:

a sensor for detecting a vehicle operating condition;

a first calculating means for estimating a view position of a driver of said vehicle which is determined by a distance reached by said vehicle after a predetermined time along a forward roadway;

a second calculating means for estimating at least one of a deviation angle formed by a running direction of said vehicle and a direction of said driver's view position, and an upper bright-dark limit of the head lamp;

a control means for controlling the light distribution composed of beam orientation/spread and upper bright-dark limit of said head lamp on a basis of a result of calculation by said first and second calculating means, said control means including a control-lamp selecting means for automatically selecting a high-beam head lamp or a low-beam head lamp based on a result of the first calculating means.

2. An apparatus for controlling light distribution of a head lamp of a vehicle according to clam 1, further comprising:

an optic or image sensor for detecting a forward roadway of said vehicle, and serving as a source of information representing a configuration of the forward roadway.

3. An apparatus for controlling light distribution of a head lamp of a vehicle according to claim 1, wherein said second calculating means calculates said deviation angle formed between a running direction of a vehicle and a direction of driver's view position of said vehicle, and said light distribution of the head lamp is calculated on a basis of said driver's view position and said deviation angle.

4. An apparatus for controlling light distribution of a head lamp of a vehicle according to claim 1, further comprising:

a differential GPS for detecting a forward roadway of said vehicle, and serving as a source of information representing a configuration of the forward roadway.

5. An apparatus for controlling light distribution of a head lamp of a vehicle according to claim 1, wherein said second calculating means calculates the deviation angle formed between said running direction of said vehicle and said direction of said driver's view position of said vehicle, and said light distribution of the head lamp is calculated on a basis of said driver's view position and said deviation angle based on a source of the information representing a configuration of the forward roadway served by differential GPS.

6. An apparatus for controlling light distribution of a head lamp of a vehicle according to claim 1, wherein said control-lamp selecting means selects the high-beam head lamp when the distance of said driver's view position exceeds a predetermined value.

7. An apparatus for controlling light distribution of a head lamp of a vehicle according to claim 1, wherein said second calculating means further calculates said upper bright-dark limit of the head lamp on the basis of said driver's view position, when said control-lamp selecting means selects the low-beam head lamp.

8. An apparatus for controlling light distribution of a head lamp of a vehicle in which performance is changeable, comprising:

a sensor for detecting a vehicle operating condition;

a first calculating means for estimating a view position of a driver of said vehicle which is determined by a distance reached by said vehicle after an estimated time along a forward roadway, said estimated time being determined in accordance with a driver's abilities which is determined by the level of driving skillfulness;

a second calculating means for estimating at least one of a deviation angle formed by a running direction of said vehicle and a direction of said driver's view position, and an upper bright-dark limit of the head lamp;

a control means for controlling the light distribution composed of beam orientation/spread and upper bright-dark limit of said head lamp on a basis of a result of a calculation by said first and second calculating means, said control means including a control-lamp selecting means for automatically selecting a high-beam head lamp or a low-beam head lamp automatically based on a result of the first calculating means.

9. An apparatus for controlling light distribution of a head lamp of a vehicle according to claim 8, further comprising:

an optic or image sensor for detecting a forward roadway of said vehicle, and serving as a source of information representing a configuration of the forward roadway.

10. An apparatus for controlling light distribution of a head lamp of a vehicle according to claim 8, wherein said second calculating means calculates said deviation angle formed between a running direction of a vehicle and a direction of said driver's view position of said vehicle, and said light distribution of the head lamp is calculated on a basis of said driver's view position and said deviation angle.

11. An apparatus for controlling light distribution of a head lamp of a vehicle according to claim 8, wherein said control-lamp selecting means selects the high-beam head lamp when a distance of said driver's view position exceeds a predetermined value.

12. An apparatus for controlling light distribution of a head lamp according to claim 8, wherein said second calculating means further calculates said upper bright-dark limit of the head lamp on a basis of said driver's view position when said control-lamp selecting means selects the low-beam head lamp.

13. An apparatus for controlling light distribution of a head lamp of a vehicle in which performance is changeable, comprising:

a sensor for detecting a vehicle operating condition;

a first calculating means for estimating a view position of a driver of said vehicle which is determined by a distance reached by said vehicle after a predetermined time along a forward roadway;

a second calculating means for estimating a deviation angle formed by a running direction of said vehicle and a direction of said driver's view position, and said deviation angle being modified within the driver's field of vision based on a configuration of the forward roadway;

a control means for controlling the light distribution composed of beam orientation/spread and upper bright-dark limit of said head lamp on a basis of a result of a calculation by said first and second calculating means, said control means including a control-lamp selecting means for automatically selecting a high-beam head lamp or a low-beam head lamp based on a result of the first calculating means.

14. An apparatus for controlling light distribution of a head lamp of a vehicle according to claim 13, further comprising:

an optic or image sensor for detecting a forward roadway of said vehicle, and serving as a source of information representing the configuration of the forward roadway.

15. An apparatus for controlling light distribution of a head lamp of a vehicle according to claim 13, wherein said second calculating means calculates said deviation angle formed between a running direction of a vehicle and a direction of said driver's view position of said vehicle, and said light distribution of the head lamp is calculated on a basis of said driver's view position and said deviation angle.

16. An apparatus for controlling light distribution of a head lamp of a vehicle according to claim 13, further comprising:

a differential GPS for detecting a forward roadway of said vehicle, and serving as a source of information representing the configuration of the forward roadway.

17. An apparatus for controlling light distribution of a head lamp of a vehicle according to claim 13, wherein said second calculating means calculates the deviation angle formed between said running direction of said vehicle and said direction of said driver's view position of said vehicle, and said light distribution of the head lamp is calculated on a basis of said driver's view position and said deviation angle based on a source of information representing the configuration of the forward roadway served by the differential GPS.

18. An apparatus for controlling light distribution of a head lamp of a vehicle according to claim 13, wherein said control-lamp selecting means selects the high-beam head lamp when a distance of said driver's view position exceeds a predetermined value.

19. An apparatus for controlling light distribution of a head lamp of a vehicle according to claim 13, wherein said driver's field of vision is determined based on angles with respect to both outer lines lying within a plane of the road and a road azimuth angle from a driver's site, served by a source of information representing the configuration of the forward roadway.

20. An apparatus for controlling light distribution of a head lamp of a vehicle in which performance is changeable, comprising:

a sensor for detecting a vehicle operating condition;

a first calculating means for estimating a view position of a driver of said vehicle which is determined by a distance reached by said vehicle after a predetermined time along a forward roadway;

a second calculating means for estimating a deviation angle formed by a running direction of said vehicle and a direction of said driver's view position, and said deviation angle being modified within the driver's field of vision based on a configuration of the forward roadway;

a control means for controlling a light distribution of the high beam lamp composed of beam orientation and beam spread of said head lamp on a basis of a result of a calculation by said first and second calculating means, and for controlling a light distribution of the low beam lamp composed of beam orientation and beam spread of said head lamp on a basis of a predetermined value of estimating a driver's view position.

21. An apparatus for controlling light distribution of a head lamp of a vehicle in which performance is changeable, comprising:

a sensor for detecting a vehicle operating condition;

a first calculating means for estimating a view position of a driver of said vehicle which is determined by a distance reached by said vehicle after an estimated time along a forward roadway, said estimated time being determined in accordance with a driver's operating features;

a second calculating means for estimating at least one of a deviation angle formed by a running direction of said vehicle and a direction of said driver's view position, and an upper bright-dark limit of the head lamp;

a control means for controlling the light distribution composed of beam orientation/spread and upper bright-dark limit of said head lamp on a basis of a result of a calculation by said first and second calculating means, said control means including a control-lamp selecting means for automatically selecting a high-beam head lamp or a low-beam head lamp based on a result of the first calculating means.

* * * * *